US008708263B2

(12) United States Patent
Young et al.

(10) Patent No.: US 8,708,263 B2
(45) Date of Patent: *Apr. 29, 2014

(54) HAMMER

(76) Inventors: Roger T. Young, Prophetstown, IL (US); Loren Bakko, Glenwood, MN (US)

(*) Notice: Subject to any disclaimer, the term of this patent is extended or adjusted under 35 U.S.C. 154(b) by 608 days.

This patent is subject to a terminal disclaimer.

(21) Appl. No.: 12/939,497

(22) Filed: Nov. 4, 2010

(65) Prior Publication Data

US 2011/0042498 A1 Feb. 24, 2011

Related U.S. Application Data

(63) Continuation-in-part of application No. 12/882,422, filed on Sep. 15, 2010, now Pat. No. 8,033,490, which is a continuation of application No. 12/398,007, filed on Mar. 4, 2009, now Pat. No. 7,819,352, which is a continuation-in-part of application No. 11/897,586, filed on Aug. 31, 2007, now Pat. No. 7,621,477, which is a continuation-in-part of application No. 11/544,526, filed on Oct. 6, 2006, now Pat. No. 7,559,497, which is a continuation-in-part of application No. 11/150,430, filed on Jun. 11, 2005, now Pat. No. 7,140,569, which is a continuation-in-part of application No. 10/915,750, filed on Aug. 11, 2004, now abandoned.

(60) Provisional application No. 61/257,958, filed on Nov. 4, 2009.

(51) Int. Cl.
*B02C 13/28* (2006.01)

(52) U.S. Cl.
USPC .......................................... 241/195; 241/194

(58) Field of Classification Search
USPC .............................. 241/189.1, 194, 195, 294
See application file for complete search history.

(56) References Cited

U.S. PATENT DOCUMENTS

| | | | |
|---|---|---|---|
| 758,288 A | 4/1904 | Williams |
| 858,772 A | 7/1907 | Williams |
| 906,364 A | 12/1908 | Williams |
| 1,016,979 A | 2/1912 | Williams |
| 1,041,495 A | 10/1912 | Liggett et al. |
| 1,085,692 A | 2/1914 | Liggett |
| 1,266,894 A | 5/1918 | Williams |

(Continued)

OTHER PUBLICATIONS

Jacobs Corporation, "The Pentagon not a Hammer, A System"—Product Brochure, USA. (It is my current belief that the hammers described in this brochure were not offered for sale prior to Nov. 19, 2008.).

*Primary Examiner* — Mark Rosenbaum
(74) *Attorney, Agent, or Firm* — Hamilton IP Law, PC; Jay R. Hamilton; Charles A. Damschen

(57) ABSTRACT

The various embodiments disclosed and pictured illustrate a hammer for comminuting various materials. The embodiments pictured and described herein are primarily for use with a rotatable hammermill assembly. The hammer includes a connector end having a rod hole therein, a contact end for delivery of energy to the material to be comminuted, and a neck affixing the connector end to the contact end. The neck is formed with at least one neck recess therein. In other embodiments, one or more shoulders are positioned around the periphery of the rod hole for added strength. In still other embodiments, the contact end is configured with more than one contact surface.

11 Claims, 17 Drawing Sheets

(56) References Cited

U.S. PATENT DOCUMENTS

| | | | |
|---|---|---|---|
| RE14,865 E | 6/1918 | Plaisted |
| RE14,920 E | 4/1919 | Plaisted |
| 1,433,042 A | 10/1922 | Sedberry |
| 1,444,990 A | 2/1923 | Wauthier |
| 1,678,723 A | 7/1928 | Clement |
| 1,693,058 A | 11/1928 | Shelton |
| 1,759,905 A | 5/1930 | Keith |
| 1,760,097 A | 5/1930 | Williams |
| 1,761,038 A | 6/1930 | Liggett |
| 1,787,526 A | 1/1931 | Honstain |
| 1,827,986 A | 10/1931 | Inglehart |
| 1,829,325 A | 10/1931 | Alfred |
| 1,854,844 A | 4/1932 | Kaemmerling |
| 1,889,129 A | 11/1932 | Nielsen |
| 1,911,718 A | 5/1933 | Saunders |
| 1,954,175 A | 4/1934 | Jensen |
| 1,997,553 A | 4/1935 | Taylor, Jr. et al. |
| 2,015,581 A | 9/1935 | Armour |
| 2,207,455 A | 7/1940 | Clement |
| 2,237,510 A | 4/1941 | Tankersley |
| 2,244,577 A | 6/1941 | Schreiber |
| 2,566,758 A | 9/1951 | Anderson |
| 2,607,538 A | 8/1952 | Larson |
| 2,763,439 A | 9/1956 | Mankoff |
| 3,278,126 A | 10/1966 | Ratkowski |
| 3,379,383 A * | 4/1968 | Stepanek | 241/86.2 |
| 3,482,789 A | 12/1969 | Newell |
| 3,627,212 A | 12/1971 | Stanton |
| 3,738,586 A | 6/1973 | Fabert, Jr. |
| 4,129,262 A | 12/1978 | Lowry |
| 4,141,512 A | 2/1979 | Francis |
| 4,142,687 A | 3/1979 | Potwin |
| 4,162,767 A | 7/1979 | Hahn |
| 4,177,956 A | 12/1979 | Fawcett |
| 4,341,353 A | 7/1982 | Hamilton et al. |
| 4,343,438 A | 8/1982 | Slikas et al. |
| 4,352,774 A | 10/1982 | Hornberger |
| 4,558,826 A | 12/1985 | Martinek |
| 4,729,516 A | 3/1988 | Williams, Jr. |
| 4,795,103 A | 1/1989 | Lech |
| 4,907,750 A | 3/1990 | Seifert |
| 4,915,310 A | 4/1990 | Stelk |
| 5,002,233 A | 3/1991 | Williams |
| 5,072,888 A | 12/1991 | Stelk |
| 5,364,038 A | 11/1994 | Prew |
| 5,377,919 A | 1/1995 | Rogers et al. |
| 5,381,975 A | 1/1995 | Chon |
| 5,443,216 A | 8/1995 | Lajoie |
| 5,465,912 A | 11/1995 | Graybill |
| 5,605,291 A | 2/1997 | Doskocil |
| 5,611,496 A | 3/1997 | Fleenor |
| 5,628,467 A | 5/1997 | Graveman |
| 5,692,688 A | 12/1997 | Waitman et al. |
| 5,722,607 A | 3/1998 | Hellmich |
| 5,842,653 A | 12/1998 | Elliott et al. |
| 5,904,306 A | 5/1999 | Elliott et al. |
| 6,045,072 A | 4/2000 | Zehr |
| 6,131,838 A | 10/2000 | Balvanz |
| 6,142,400 A | 11/2000 | Balvanz et al. |
| 6,260,778 B1 | 7/2001 | Wenger |
| 6,364,227 B1 | 4/2002 | Dorscht |
| 6,419,173 B2 | 7/2002 | Balvanz et al. |
| 6,481,654 B1 | 11/2002 | Balvanz |
| 6,517,020 B1 | 2/2003 | Smith |
| 6,622,951 B1 | 9/2003 | Recker |
| 6,971,598 B2 | 12/2005 | Schillinger et al. |
| 7,140,569 B2 | 11/2006 | Young |
| 7,419,109 B1 | 9/2008 | Ronfeldt et al. |
| 7,559,497 B2 | 7/2009 | Young |
| 7,621,477 B2 * | 11/2009 | Young | 241/194 |
| 7,819,352 B2 * | 10/2010 | Young | 241/195 |
| 8,033,490 B1 * | 10/2011 | Young et al. | 241/194 |
| 2002/0190148 A1 | 12/2002 | Roozeboom et al. |
| 2007/0023554 A1 | 2/2007 | Young |

\* cited by examiner

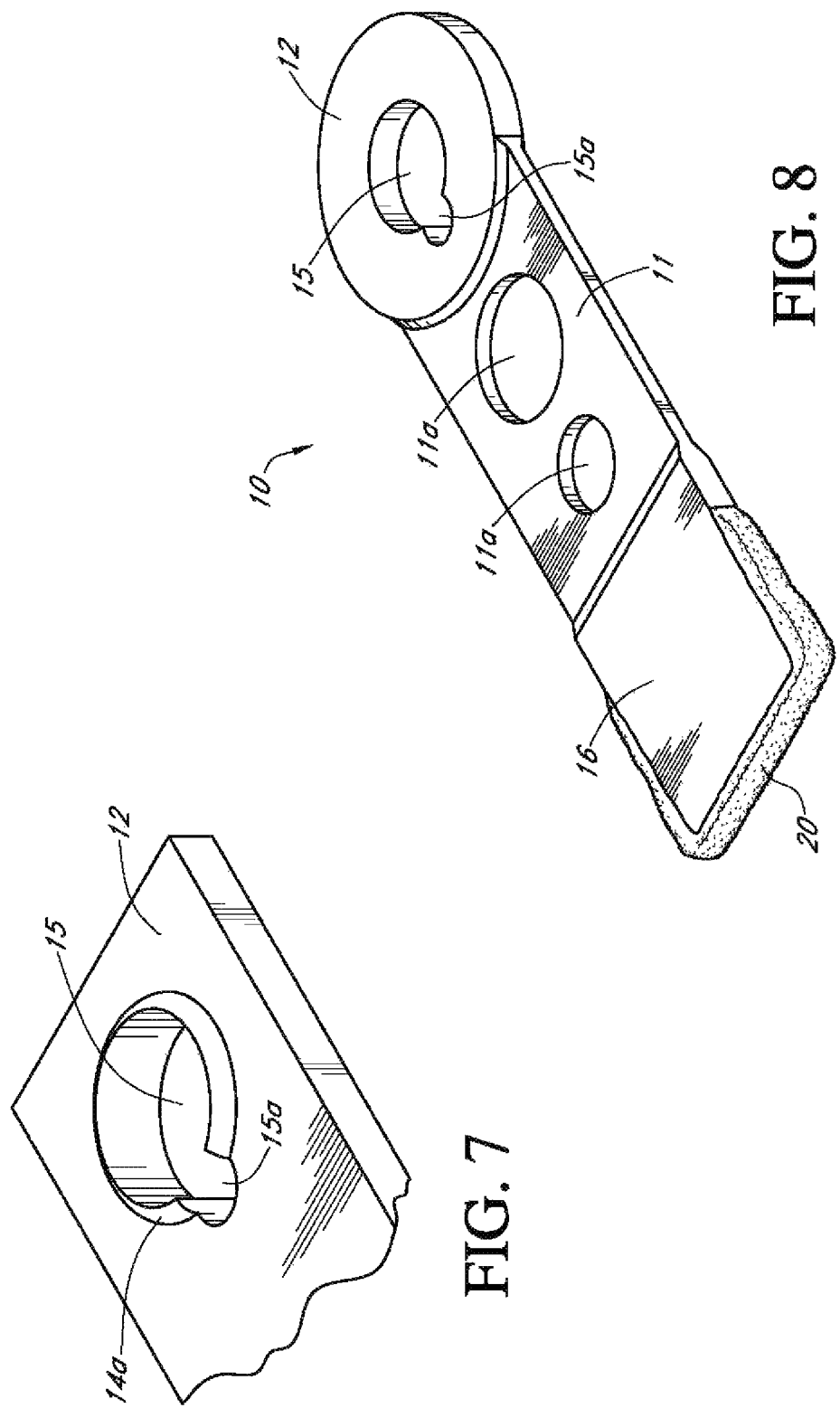

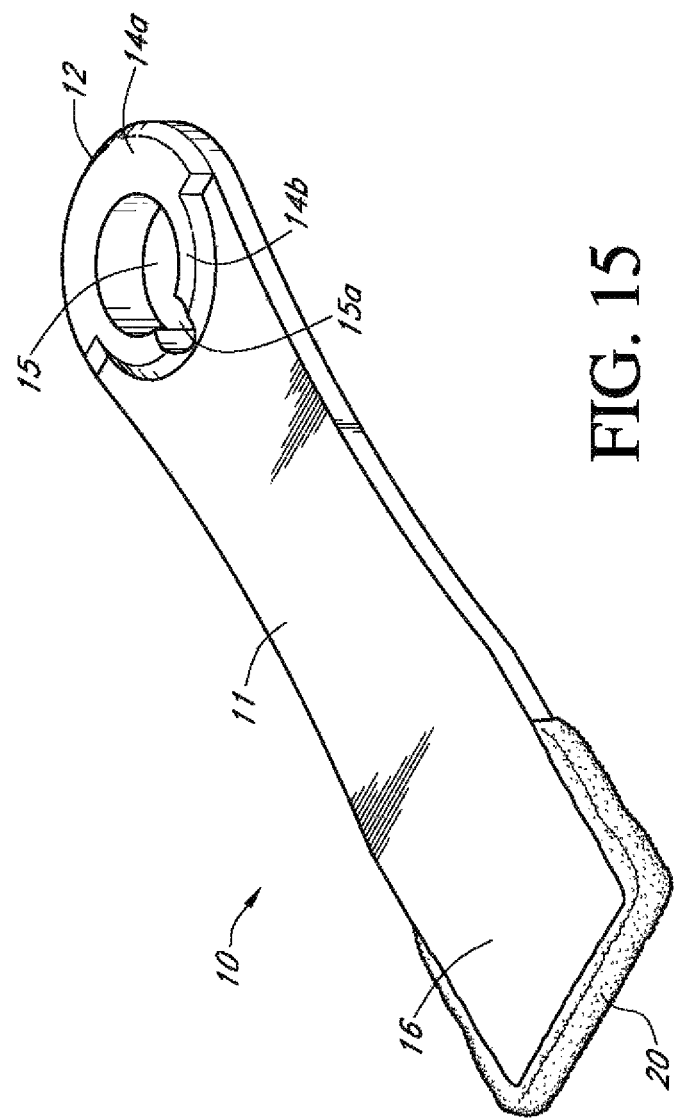

HAMMER

CROSS REFERENCE TO RELATED APPLICATIONS

Applicant states that this utility patent application claims priority from and is a continuation in part of U.S. patent application Ser. No. 12/882,422, filed Sep. 15, 2010, now U.S. Pat. No. 8,033,490, which patent application is a continuation of U.S. patent application Ser. No. 12/398,007, filed Mar. 4, 2009, now U.S. Pat. No. 7,819,352 and claims priority therefrom, which application is a continuation-in-part of U.S. patent application Ser. No. 11/897,586 filed on Aug. 31, 2007, now U.S. Pat. No. 7,621,477 which application is a continuation-in-part of U.S. patent application Ser. No. 11/544,526 (now U.S. Pat. No. 7,559,497) filed on Oct. 6, 2006, which application is a continuation-in-part of U.S. patent application Ser. No. 11/150,430 now (U.S. Pat. No. 7,140,569) filed on Jun. 11, 2005, which was a continuation-in-part of U.S. patent application Ser. No. 10/915,750 filed on Aug. 11, 2004, now abandoned, all of which are incorporated by reference herein in their entireties. Applicant also claims priority from provisional U.S. patent application Ser. No. 61/257,958 filed on Nov. 4, 2009.

FIELD OF INVENTION

This invention relates generally to a device for comminuting or grinding material. More specifically, the invention is especially useful for use as a hammer in a rotatable hammermill assembly.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

BACKGROUND

A number of different industries rely on impact grinders or hammermills to reduce materials to a smaller size. For example, hammermills are often used to process forestry and agricultural products as well as to process minerals, and for recycling materials. Specific examples of materials processed by hammermills include grains, animal food, pet food, food ingredients, mulch and even bark. This invention although not limited to grains, has been specifically developed for use in the grain industry. Whole grain corn essentially must be cracked before it can be processed further. Dependent upon the process, whole corn may be cracked after tempering yet before conditioning. A common way to carry out particle size reduction is to use a hammermill where successive rows of rotating hammer like devices spinning on a common rotor next to one another comminute the grain product. For example, methods for size reduction as applied to grain and animal products are described in Watson, S. A. & P. E. Ramstad, ed. (1987, Corn: Chemistry and Technology, Chapter 11, American Association of Cereal Chemist, Inc., St. Paul, Minn.), the disclosure of which is hereby incorporated by reference in its entirety. The application of the invention as disclosed and herein claimed, however, is not limited to grain products or animal products.

Hammermills are generally constructed around a rotating shaft that has a plurality of disks provided thereon. A plurality of free-swinging hammers are typically attached to the periphery of each disk using hammer rods extending the length of the rotor. With this structure, a portion of the kinetic energy stored in the rotating disks is transferred to the product to be comminuted through the rotating hammers. The hammers strike the product, driving into a sized screen, in order to reduce the material. Once the comminuted product is reduced to the desired size, the material passes out of the housing of the hammermill for subsequent use and further processing. A hammer mill will break up grain, pallets, paper products, construction materials, and small tree branches. Because the swinging hammers do not use a sharp edge to cut the waste material, the hammer mill is more suited for processing products which may contain metal or stone contamination wherein the product the may be commonly referred to as "dirty". A hammer mill has the advantage that the rotatable hammers will recoil backwardly if the hammer cannot break the material on impact. One significant problem with hammer mills is the wear of the hammers over a relatively short period of operation in reducing "dirty" products which include materials such as nails, dirt, sand, metal, and the like. As found in the prior art, even though a hammermill is designed to better handle the entry of a "dirty" object, the possibility exists for catastrophic failure of a hammer causing severe damage to the hammermill and requiring immediate maintenance and repairs.

Hammermills may also be generally referred to as crushers—which typically include a steel housing or chamber containing a plurality of hammers mounted on a rotor and a suitable drive train for rotating the rotor. As the rotor turns, the correspondingly rotating hammers come into engagement with the material to be comminuted or reduced in size. Hammermills typically use screens formed into and circumscribing a portion of the interior surface of the housing. The size of the particulate material is controlled by the size of the screen apertures against which the rotating hammers force the material. Exemplary embodiments of hammermills are disclosed in U.S. Pat. Nos. 5,904,306; 5,842,653; 5,377,919; and 3,627,212.

The four metrics of strength, capacity, run time and the amount of force delivered are typically considered by users of hammermill hammers to evaluate any hammer to be installed in a hammermill. A hammer to be installed is first evaluated on its strength. Typically, hammermill machines employing hammers of this type are operated twenty-four hours a day, seven days a week. This punishing environment requires strong and resilient material that will not prematurely or unexpectedly deteriorate. Next, the hammer is evaluated for capacity, or more specifically, how the weight of the hammer affects the capacity of the hammermill. The heavier the hammer, the fewer hammers that may be used in the hammermill by the available horsepower. A lighter hammer then increases the number of hammers that may be mounted within the hammermill for the same available horsepower. The more force that can be delivered by the hammer to the material to be comminuted against the screen increases effective comminution (i.e. cracking or breaking down of the material) and thus the efficiency of the entire comminution process is increased. In the prior art, the amount of force delivered is evaluated with respect to the weight of the hammer.

Finally, the length of run time for the hammer is also considered. The longer the hammer lasts, the longer the machine run time, the larger profits presented by continuous processing of the material in the hammermill through reduced maintenance costs and lower necessary capital inputs. The four metrics are interrelated and typically tradeoffs are necessary to improve performance. For example, to increase the amount of force delivered, the weight of the hammer could be increased. However, because the weight of the hammer increased, the capacity of the unit typically will be decreased because of horsepower limitations. There is a need to improve upon the design of hammermill hammers available in the prior art for optimization of the four (4) metrics listed above.

Free-Swinging Hammermill Assemblies

Rotatable hammermill assemblies as found in the prior art, which are well known and therefore not pictured herein, generally includes two end plates on each end with at least one interior plate positioned between the two end plates. The end plates include an end plate drive shaft hole and the interior plates include an interior plate drive shaft hole. A hammermill drive shaft passes through the end plate drive shaft holes and the interior plate drive shaft holes. The end plates and interior plates are affixed to the hammermill drive shaft and rotatable therewith.

Each end plate also includes a plurality of end plate hammer rod holes, and each interior plate includes a plurality of interior plate hammer rod holes. A hammer rod passes through corresponding end plate hammer rod holes and interior plate hammer rod holes. A plurality of hammers is pivotally mounted to each hammer rod. The hammers are typically oriented in rows along each hammer rod, and each hammer rod is typically oriented parallel to one another and to the hammermill drive shaft.

The hammermill assembly and various elements thereof rotate about the longitudinal axis of the hammermill drive shaft. As the hammermill assembly rotates, centrifugal force causes the hammers to rotate about the hammer rod to which each hammer is mounted. Free-swinging hammers are often used instead of rigidly connected hammers in case lodged metal, foreign objects, or other non-crushable material enters the housing with the particulate material to be reduced, which material may be a cereal grain For effective comminution in hammermill assemblies using free-swinging hammers, the rotational speed of the hammermill assembly must produce sufficient centrifugal force to hold the hammers as close to the fully extended position as possible when material is being comminuted. Depending on the type of material being processed, the minimum hammer tip speeds of the hammers are usually 5,000 to 11,000 feet per minute (FPM). In comparison, the maximum speeds depend on shaft and bearing design, but usually do not exceed 30,000 FPM. In special high-speed applications, the hammermill assemblies may be configured to operate up to 60,000 FPM.

In the case of disassembly for the purposes of repair and replacement of worn or damaged parts, the wear and tear causes considerable difficulty in realigning and reassembling the various elements of the hammermill assembly. Moreover, the elements of the hammermill assembly are typically keyed to one another, or at least to the hammermill drive shaft, which further complicates the assembly and disassembly process. For example, the replacement of a single hammer may require disassembly of the entire hammermill assembly. Given the frequency at which wear parts require replacement, replacement and repairs constitute an extremely difficult and time consuming task that considerably reduces the operating time of the size reducing machine.

Applicant is the inventor on various other patents and patent applications relating to hammers for use in comminuting materials. Accordingly, U.S. Pat. Nos. 7,140,569; 7,559,497; and 7,621,477 and U.S. Pub. App. No. 2009/0224090 are incorporated by reference herein in their entireties.

Although not shown in detail herein, one of ordinary skill will appreciate that the present art may be applied to the designs and inventions protected by patents held by Applicant or others without limitation, dependent only upon a particular need or application, including:

| Patent Number | Title |
| --- | --- |
| D588,174 | Hammermill hammer |
| D573,163 | Hammermill hammer |
| D555,679 | Hammermill hammer |
| D552,639 | Hammermill hammer |
| D551,267 | Hammermill hammer |
| D551,266 | Hammermill hammer |
| D550,728 | Hammermill hammer |
| D545,847 | Hammermill hammer |
| D545,846 | Hammermill hammer |
| D545,328 | Hammermill hammer |
| D545,327 | Hammermill hammer |
| D544,504 | Hammermill hammer |
| D544,503 | Hammermill hammer |
| D536,352 | Hammermill hammer |
| D536,351 | Hammermill hammer |
| D536,350 | Hammermill hammer |

The preceding cited patents are incorporated by reference herein in their entireties.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

FIG. 7 provides a detailed perspective view of the rod hole of the first embodiment of a notched hammer.

FIG. 8 provides a perspective view of a second embodiment of a notched hammer.

FIG. 15 provides a perspective view of a ninth embodiment of a notched hammer.

DETAILED DESCRIPTION—LISTING OF ELEMENTS

Figure 1:
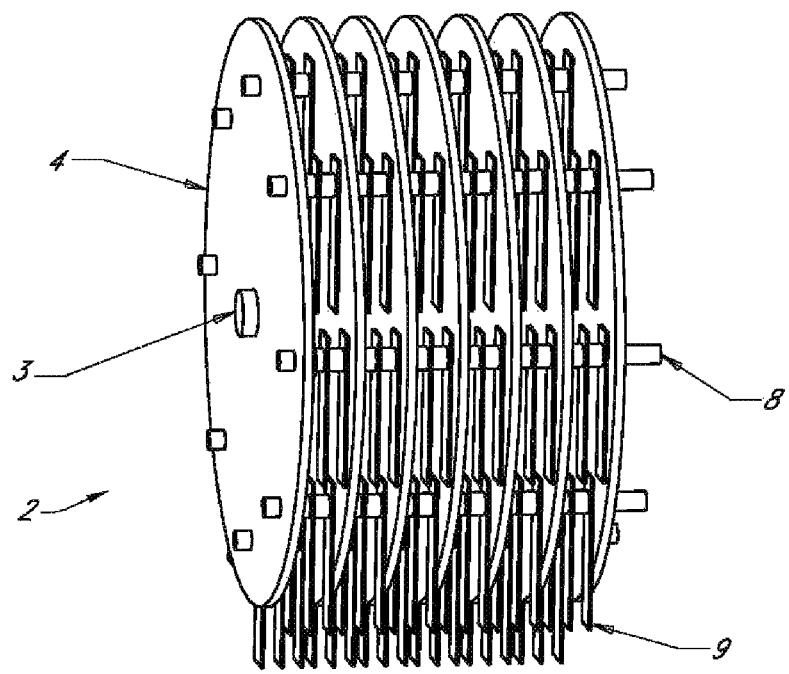
FIG. 1 provides a perspective view of the internal configuration of a hammer mill at rest as commonly found in the prior art.

| ELEMENT DESCRIPTION | ELEMENT NUMBER |
| --- | --- |
| Hammermill assembly | 2 |
| Hammermill drive shaft | 3 |
| End plate | 4 |
| End plate drive shaft hole | 5a |
| End plate hammer rod hole | 5b |
| Interior plate | 6 |
| Interior plate drive shaft hole | 7a |
| Interior plate hammer rod hole | 7b |
| Hammer rod | 8 |
| Spacer | 8a |
| Hammer (prior art) | 9 |
| Hammer body (prior art) | 9a |
| Hammer contact edge (prior art) | 9b |
| Hammer rod hole (prior art) | 9c |
| Notched hammer | 10 |
| Notched hammer neck | 11 |
| Neck void | 11a |
| Notched hammer first end | 12 |
| Notched hammer first shoulder | 14a |
| Notched hammer second shoulder | 14b |
| Notched hammer rod hole | 15 |
| Rod hole notch | 15a |
| Notched hammer second end | 16 |
| Hardened contact edge | 20 |
| First contact surface | 22a |
| First contact point | 22b |
| Second contact surface | 24a |
| Second contact point | 24b |
| Third contact surface | 26a |
| Third contact point | 26b |
| Fourth contact point | 28 |
| Edge pocket | 29 |
| Multiple blade hammer | 30 |
| Multiple blade hammer neck | 31 |
| Multiple blade hammer first end | 32 |
| Multiple blade hammer first shoulder | 34a |
| Multiple blade hammer second shoulder | 34b |
| Multiple blade hammer rod hole | 35 |
| Multiple blade hammer second end | 36 |
| First blade | 37a |
| Second blade | 37b |
| Third blade | 37c |
| Blade edge | 38 |
| Dual-blade hammer | 110 |

-continued

| ELEMENT DESCRIPTION | ELEMENT NUMBER |
| --- | --- |
| Connector end | 120 |
| Rod hole | 122 |
| First shoulder | 124a |
| Second shoulder | 124b |
| Notch | 126 |
| Neck | 130 |
| Neck first end | 132 |
| Neck second end | 134 |
| Neck recess | 136 |
| Neck edge | 138 |
| Contact end | 140 |
| First contact surface | 142a |
| Second contact surface | 142b |
| Interstitial area | 144 |

DETAILED DESCRIPTION—EXEMPLARY EMBODIMENTS

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance. Furthermore, any dimensions recited or called out herein are for exemplary purposes only and are not meant to limit the scope of the invention in any way unless so recited in the claims.

DETAILED DESCRIPTION

1. Free-Swinging Hammermill Assemblies

Figure 2:
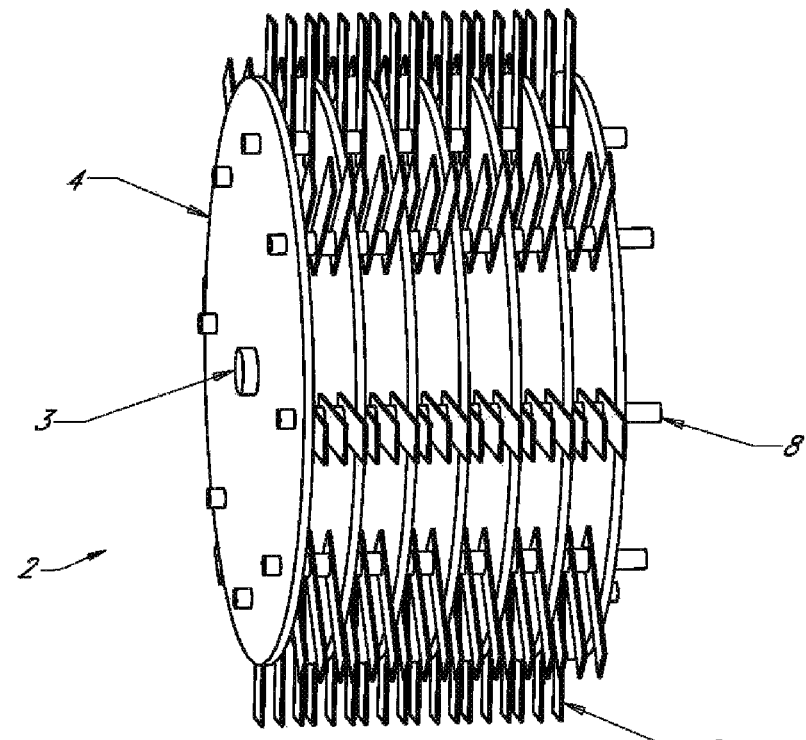
FIG. 2 provides a perspective view of the internal configuration of a hammermill during operation as commonly found in the prior art.
Figure 3:
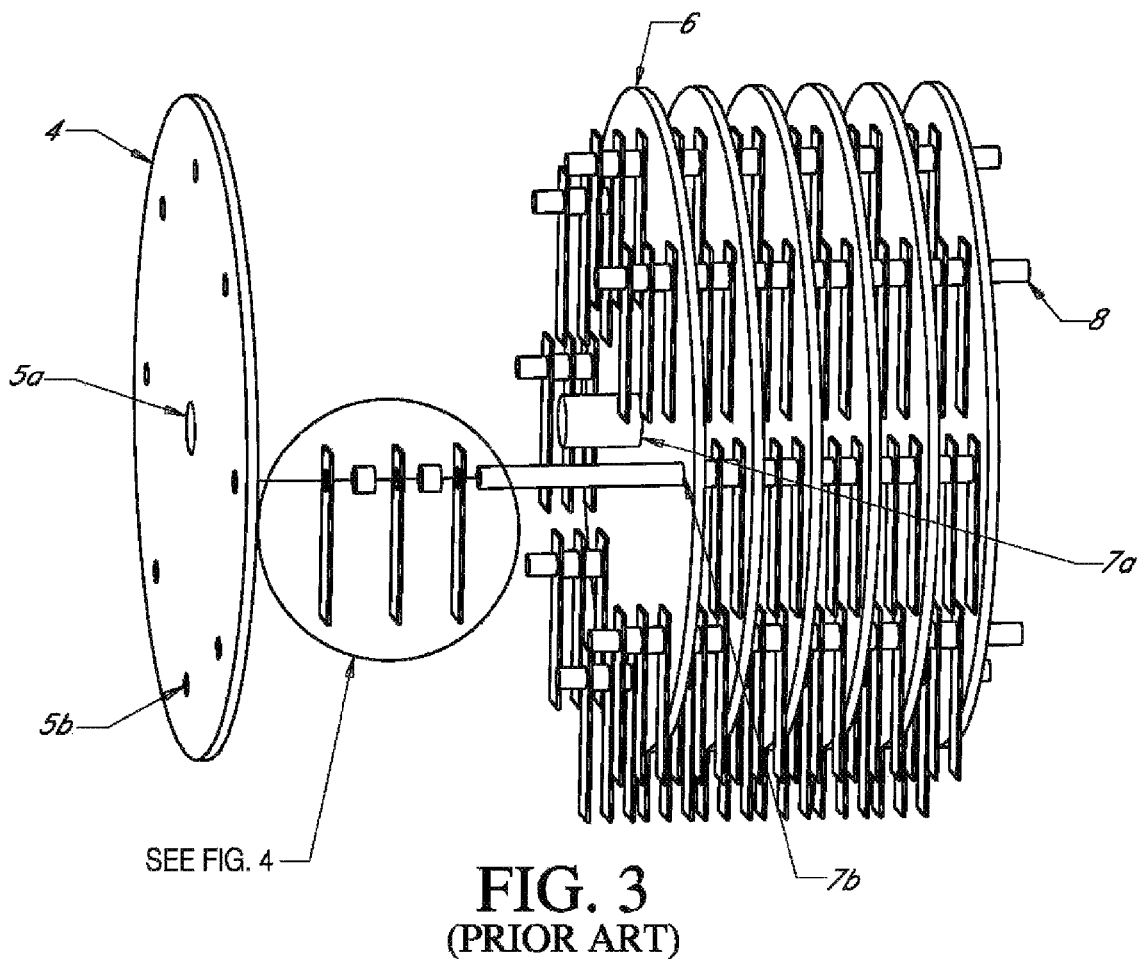
FIG. 3 provides an exploded perspective view of a hammermill as found in the prior art as shown in FIG. 1.

Referring now to the drawings, wherein like reference numerals designate identical or corresponding parts throughout the several views, FIGS. 1-3 show a hammermill assembly 2 as found in the prior art. The hammermill assembly 2 includes two end plates 4 on each end with at least one interior plate 6 positioned between the two end plates 4. The end plates 4 include an end plate drive shaft hole 5a and the interior plates 6 include an interior plate drive shaft hole 7a. A hammermill drive shaft 3 passes through the end plate drive shaft holes 5a and the interior plate drive shaft holes 7a. The end plates 4 and interior plates 6 are affixed to the hammermill drive shaft and rotatable therewith.

Each end plate 4 also includes a plurality of end plate hammer rod holes 5b, and each interior plate 6 includes a plurality of interior plate hammer rod holes 7b. A hammer rod 8 passes through corresponding end plate hammer rod holes 5b and interior plate hammer rod holes 7b. A plurality of hammers 9 are pivotally mounted to each hammer rod 8, which is shown in detail in FIG. 4. The hammers 9 are typically oriented in rows along each hammer rod 8, and each hammer rod 8 is typically oriented parallel to one another and to the hammermill drive shaft 3.

Figure 4:
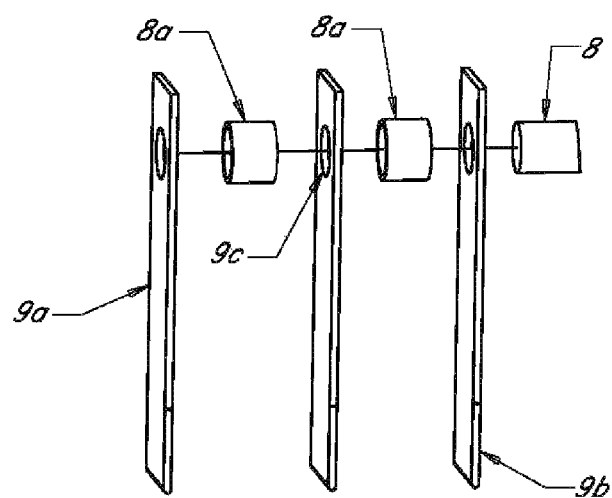
FIG. 4 provides an enlarged perspective view of the attachment methods and apparatus as found in the prior art and illustrated in FIG. 3.

Each hammer 9 includes a hammer body 9a, hammer contact edge 9b, and a hammer rod hole 9c passing through the hammer body 9a, which is shown in detail in FIG. 4. Each hammer rod 8 passes through the hammer rod hole 9c of at least one hammer 9. Accordingly, the hammers 9 pivot with respect to the hammer rod 8 to which they are attached about the center of the hammer rod hole 9c. A spacer 8a may be positioned around the hammer rod 8 and between adjacent hammers 9 or adjacent hammers 9 and plates 4, 6 to better align the hammers 9 and/or plates 4, 6, which is best shown in FIGS. 3-4. As is well known to those of skill in the art, a lock collar (not shown) would typically be placed on the end of the hammer rod 8 to compress and hold the spacers 8a and the hammers 9 in alignment. All these parts require careful and precise alignment relative to one another. This type of hammer 9, which is shown affixed to the hammermill assembly 2 shown in FIGS. 1-3 and separately in FIG. 4, is commonly referred to as free-swinging hammers 9. Free-swinging hammers 9 are hammers 9 that are pivotally mounted to the hammermill assembly 9 in a manner as described above and are oriented outwardly from the center of the hammermill assembly 2 by centrifugal force as the hammermill assembly 2 rotates.

The hammermill assembly 2 and various elements thereof rotate about the longitudinal axis of the hammermill drive shaft 3. As the hammermill assembly 2 rotates, centrifugal force causes the hammers 9 to rotate about the hammer rod 8 to which each hammer 9 is mounted. The hammermill assembly 2 is shown at rest in FIG. 1 and in a dynamic state in FIG. 2, as in operation. Free-swinging hammers 9 are often used instead of rigidly connected hammers in case tramped metal, foreign objects, or other non-crushable material enters the housing with the particulate material to be reduced, such as grain.

For effective comminution in hammermill assemblies 2 using free-swinging hammers 9, the rotational speed of the hammermill assembly 2 must produce sufficient centrifugal force to hold the hammers 9 as close to the fully extended position as possible when material is being comminuted. Depending on the type of material being processed, the minimum hammer tip speeds of the hammers are usually 5,000 to 11,000 feet per minute ("FPM"). In comparison, the maximum speeds depend on shaft and bearing design, but usually do not exceed 30,000 FPM. In special high-speed applications, the hammermill assemblies 2 may be configured to operate up to 60,000 FPM.

In the case of disassembly for the purposes of repair and replacement of worn or damaged parts, the wear and tear causes considerable difficulty in realigning and reassembling the various elements of the hammermill assembly 2. Moreover, the elements of the hammermill assembly 2 are typically keyed to one another, or at least to the hammermill drive shaft 3, which further complicates the assembly and disassembly process. For example, the replacement of a single hammer 9 may require disassembly of the entire hammermill assembly 2. Given the frequency at which wear parts require replacement, replacement and repairs constitute an extremely difficult and time consuming task that considerably reduces the operating time of the size reducing machine. Removing a single damaged hammer 9 may take in excess of five (5) hours due to both the hammermill assembly 2 design and the realignment difficulties related to the problems caused by impact of debris with the non-impact surfaces of the hammermill assembly 2.

Another problem found in the prior art hammermill assemblies 2 shown in FIGS. 1-3 is exposure of a great deal of the surface area of the hammermill assembly 2 elements to debris. The end plates 4 and interior plates 6, spacers 8a, and hammers 9 are all subjected to considerable contact with the debris and material within the hammermill assembly 2. This not only creates excessive wear, but contributes to realignment difficulties by bending and damaging of the various elements of the hammermill assembly 2, which may be caused by residual impact. Thus, after a period of operation, prior art hammermill assemblies 2 become even more difficult to disassemble and reassemble. The problems related to comminution service and maintenance of hammermill assemblies 2 provides abundant incentive for improvement of hammers 9 to lengthen operational run times.

2. Illustrative Embodiments of Notched Hammer

Figure 5:
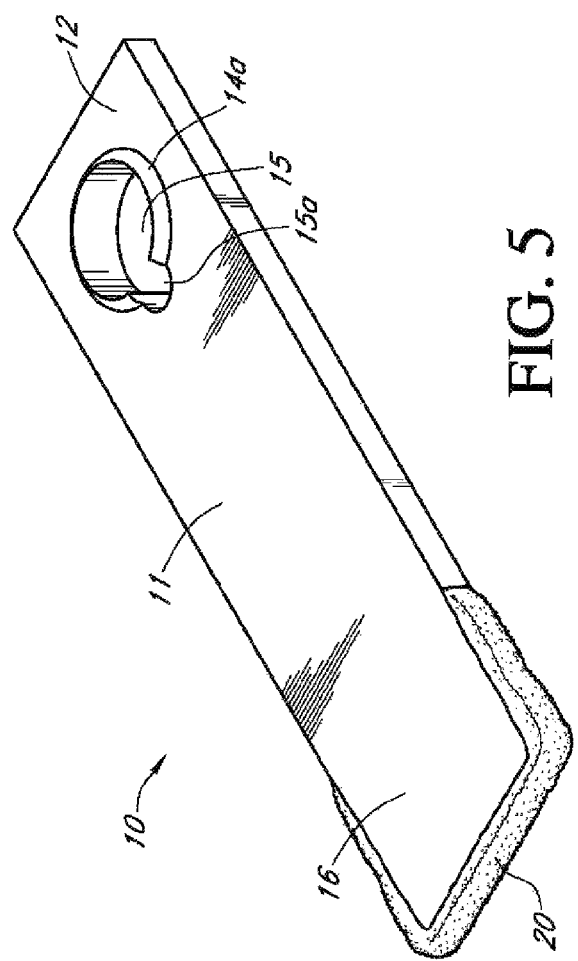
FIG. 5 provides a perspective view of a first embodiment of a notched hammer.
Figure 6:
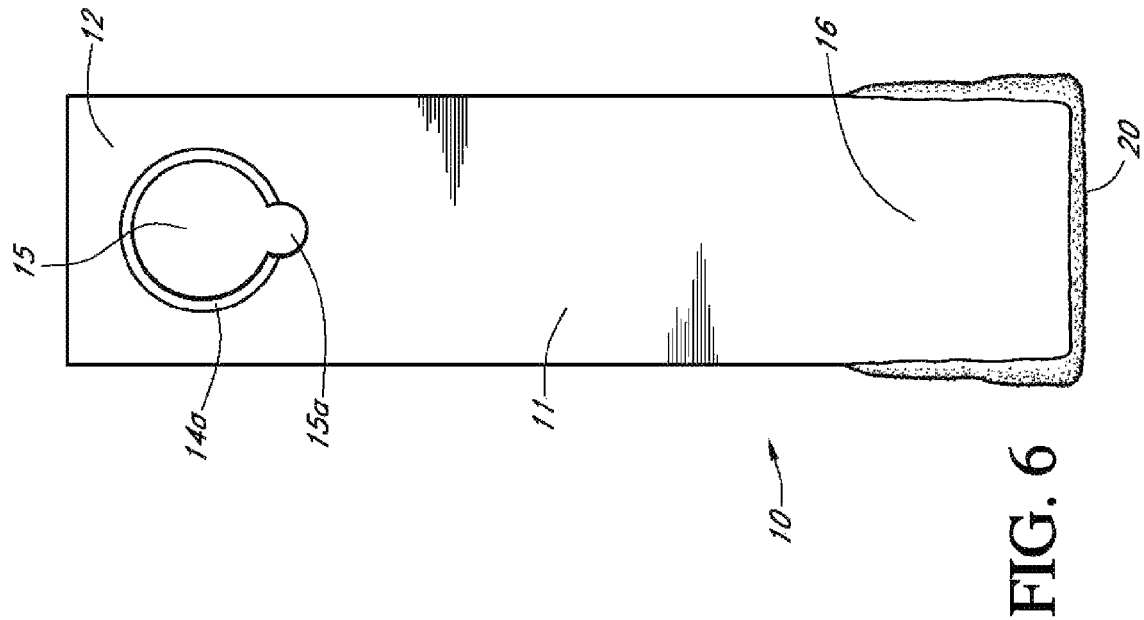
FIG. 6 provides a top view of the first embodiment of a notched hammer.

FIGS. 5-6 show a first embodiment of the notched hammer 10 for use in a rotatable hammermill assembly 2, which type of hammermill assembly 2 was previously described herein. The notched hammer 10 is comprised of a notched hammer first end 12 (also referred to herein occasionally as the securement end) for securement within the hammermill assembly 2 and a notched hammer second end 16 (also referred to herein occasionally as the contact end) for delivery of mechanical energy to and contact with the material to be comminuted. The notched hammer first end 12 is connected to the notched hammer second end 16 by a notched hammer neck 11. A notched hammer rod hole 15 is centered in the notched hammer first end 12 for engagement with and attachment of the notched hammer 10 to the hammer rod 8 of a hammermill assembly 2. Typically, the distance from the center of the notched hammer rod hole 15 to the most distal edge of the notched hammer second end 16 is referred to as the "hammer swing length."

As shown generally in FIGS. 5-6 and in detail in FIG. 7, at least one rod hole notch 15a is formed in the notched hammer rod hole 15. The at least one rod hole notch 15a transverses the length of the notched hammer rod hole 15 and is aligned with the notched hammer neck 11. As shown in the various embodiments pictured and described herein, the longitudinal axis of the rod hole notch 15a is parallel with the longitudinal axis of the notched hammer rod hole 15, but may have different orientations in embodiments not pictured or described herein, such as an embodiment wherein the rod hole notch 15a is not parallel to the longitudinal axis of the notched hammer rod hole 15. Furthermore, the cross-sectional shape of the rod hold notch 15a may be any shape, such as circular, oblong, angular, or any other shape known to those skilled in the art. Additionally, the cross-sectional shape of the rod hole notch 15a may vary along its length.

As shown in FIGS. 5-7, the sides of the notched hammer neck 11 in first embodiment of the notched hammer 10 are parallel, and the notched hammer rod hole 15 is surrounded by a notched hammer first shoulder 14a. The notched hammer first shoulder 14a is comprised of a raised, single uniform ring surrounding the notched hammer rod hole 15. The notched hammer first shoulder 14a thereby increased the material thickness around the notched hammer rod hole 15 as compared to the thickness of the notched hammer first end 12. The notched hammer first shoulder 14a increases the surface area available for distribution of the opposing forces placed on the notched hammer rod hole 15 during operation in an amount proportional to the width of the hammer. This increase in surface area allows for a longer useful life of the notched hammer 10 because the additional surface area works to decrease the amount of elongation of the notched hammer rod hole 15 while still allowing the notched hammer 10 to swing freely on the hammer rod 8 during operation. Other embodiments of the notched hammer 10 may not be configured with a notched hammer first shoulder 14a, and in still other embodiments the sides of the notched hammer neck 11 may be oriented other than parallel to one another.

The first embodiment of the notched hammer 10 also includes a hardened contact edge 20 welded on the periphery of the notched hammer second end 16. The hardened contact edge 20 is positioned on the portion of the notched hammer second end 16 that is most often in contact with the material to be comminuted during operation of the hammermill assembly 2. The hardened contact edge 20 may be comprised of any suitable material known to those skilled in the art, and it is contemplated that one such material is tungsten carbide. In other embodiments of the notched hammer 10 a hardened contact edge 20 is not positioned on the notched hammer second end 16.

A second embodiment of the notched hammer 10 is shown in FIG. 8. In the second embodiment the notched hammer neck 11 includes a plurality of neck voids 11a. As shown in FIG. 8, the second embodiment includes two neck voids 11a that are both circular in shape but have different diameters from one another. The neck voids 11a may have any shape, and each neck void 11a may have a different shape than an adjacent neck void 11a. Furthermore, neck voids 11a may have perimeters of differing values, and the neck voids 11a need not be positioned along the center line of the notched hammer neck 11. More than two neck voids 11a may be used in any the second embodiment of the notched hammer 10. The neck voids 11a may be asymmetrical or symmetrical. As shown in FIG. 8, the circular nature of the neck voids 11a allows the transmission and dissipation of the stresses produced at the notched hammer first end 12 through and along the notched hammer neck 11.

The notched hammer neck 11 in the second embodiment is not as thick as the notched hammer first end 12 or the notched hammer second end 16. This configuration of the notched hammer neck 11 allows for reduction in the overall weight of the notched hammer 10, to which attribute the neck voids 11a also contribute. The mechanical energy imparted to the notched hammer second end 16 with respect to the mechanical energy imparted to the notched hammer neck 11 is also increased with this configuration. The neck voids 11a also allow for greater agitation of the material to be comminuted during operation of the hammermill assembly 2.

Figure 9:
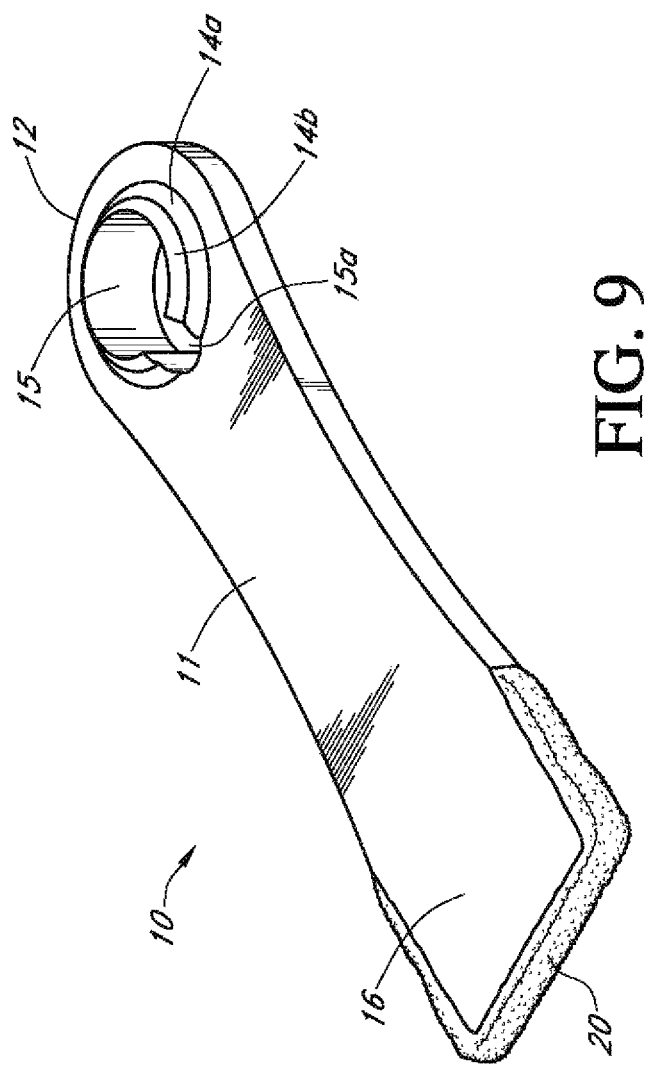
FIG. 9 provides a perspective view of a third embodiment of a notched hammer.

A third embodiment of the notched hammer 10 is shown in FIG. 9. The notched hammer rod hole 15 in the third embodiment includes a notched hammer first shoulder 14a and a notched hammer second shoulder 14b oriented symmetrically around the notched hammer rod hole 15. As explained in detail above for the first embodiment of the notched hammer 10, the first and second rod hole shoulders 14a, 14b allow the notched hammer rod hole 15 to resist elongation. In the third embodiment, the notched hammer second shoulder 14b is of a greater axial dimension than the notched hammer first shoulder 14a but of a lesser radial dimension, and both the notched hammer first and second shoulders 14a, 14b are symmetrical with respect to the notched hammer rod hole 15. This configuration increases the useful life of the notched hammer 10 while simultaneously allowing for decreased weight thereof since the portion of the notched hammer first end 12 not formed as either the notched hammer first or second shoulders 14a, 14b may be of the same thickness as the notched hammer neck 11 and notched hammer second end 16. The third embodiment is also show with a hardened contact edge 20 welded to the notched hammer second end 16, but other embodiments exist that do not have a hardened contact edge 20.

The edges of the notched hammer neck 11 in the third embodiment are non-parallel with respect to one another, and instead form an hourglass shape. This shape starts just below the notched hammer rod hole 15 and continues through the notched hammer neck 11 to the notched hammer second end 16. This hourglass shape yields a reduction in weight of the notched hammer 10 and also reduces the vibration of the notched hammer 10 during operation.

Figure 10:
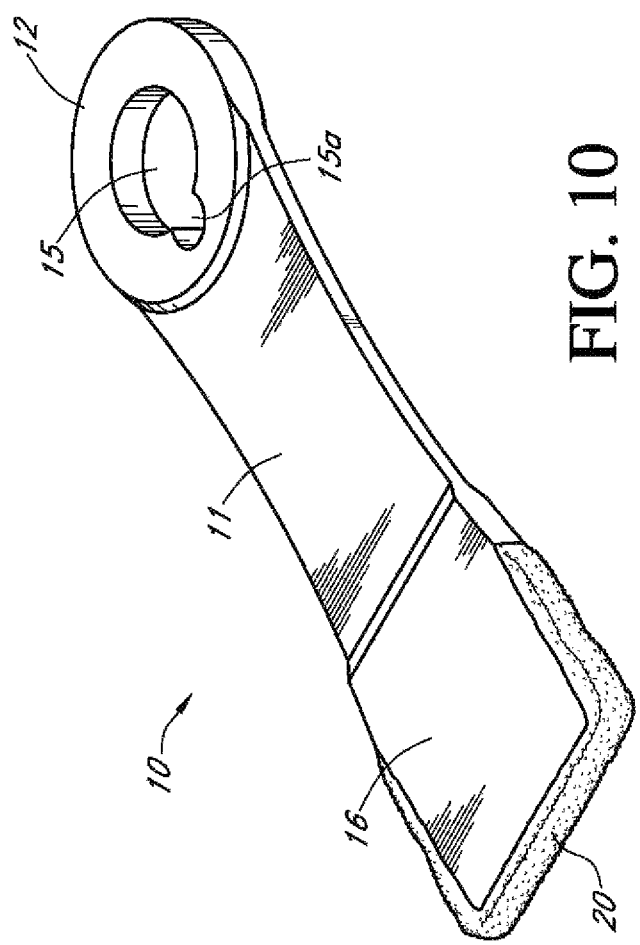
FIG. 10 provides a perspective view of a fourth embodiment of a notched hammer.

A forth embodiment of the notched hammer 10 is shown in FIG. 10, which most related to the second embodiment of the notched hammer 10 shown in FIG. 8. The fourth embodiment does not include neck voids 11a. As shown, the fourth embodiment provides the benefits of increasing the surface area available for distribution of the opposing forces placed on the notched hammer rod hole 15 in proportion to the thickness of the notched hammer neck 11 without using a notched hammer first or second shoulder 14a, 14b. As with some other embodiments disclosed and described herein, the fourth embodiment allows for decreased overall notched hammer 10 weight from the decreased thickness of notched hammer neck 11 while simultaneously reducing the likelihood of elongation of the notched hammer rod hole 15.

Figure 11:
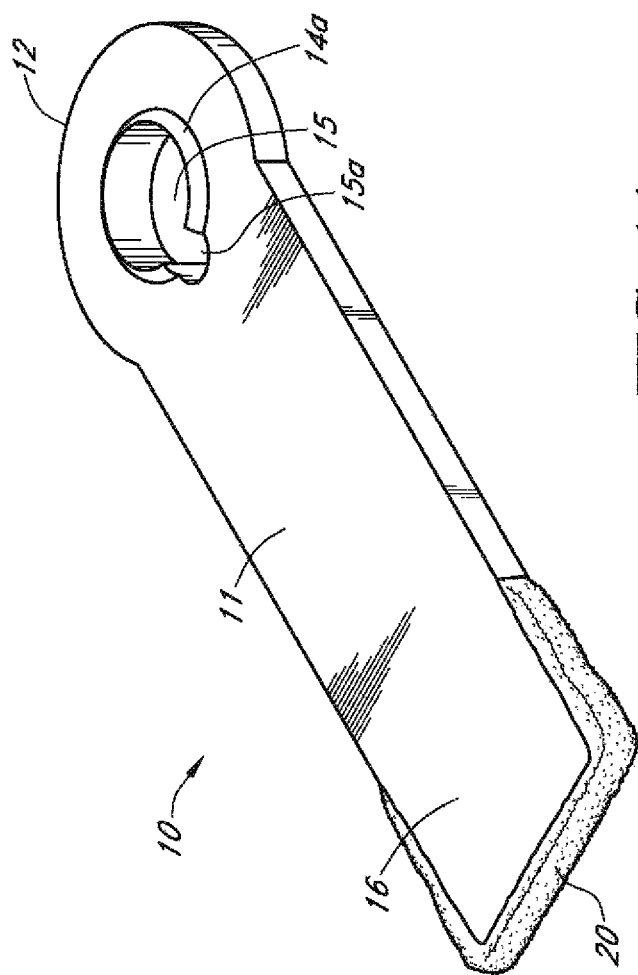
FIG. 11 provides a perspective view of a fifth embodiment of a notched hammer.

A fifth embodiment of the notched hammer is shown in FIG. 11. In the fifth embodiment, the thickness of the notched hammer first end 12, notched hammer neck 11, and notched hammer second end 16 are substantially similar. A notched hammer first shoulder 14a is positioned around the periphery of the notched hammer rod hole 15 for additional strength and to reduce elongation thereof, as explained in detail above. Additionally, the fifth embodiment includes a hardened contact edge 20. The rounded shape of the notched hammer first end 12 strengthens the notched hammer first end 12 by improving the transmission of hammer rod 8 vibrations away from the notched hammer first end 12, through the notched hammer neck 11 to the notched hammer second end 16. The rounded shape also allows for overall weight reduction of the notched hammer 10. The edges of the notched hammer neck 11 are parallel in the fifth embodiment, but they may also be curved to create an hourglass shape as previously disclosed for other embodiments.

Figure 12:
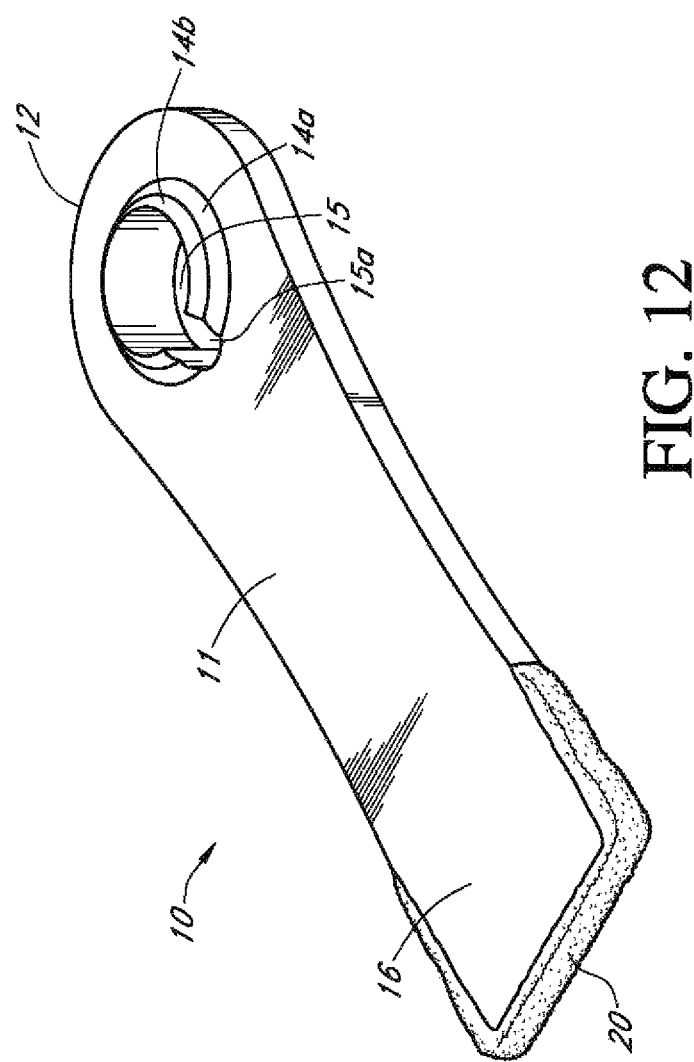
FIG. 12 provides a perspective view of a sixth embodiment of a notched hammer.

A sixth embodiment of the notched hammer is shown in FIG. 12. In this embodiment, notched hammer first and second shoulders 14a, 14b are positioned around the periphery of the notched hammer rod hole 15 to prevent elongation thereof. As with the fifth embodiment, the thickness of the notched hammer first end 12, notched hammer neck 11, and notched hammer second end 16 are substantially equal. The sixth embodiment also includes a hardened contact edge 20, and the edges of the notched hammer neck 11 are curved to improve vibration energy transfer as previously described for similar configurations.

Figure 13:
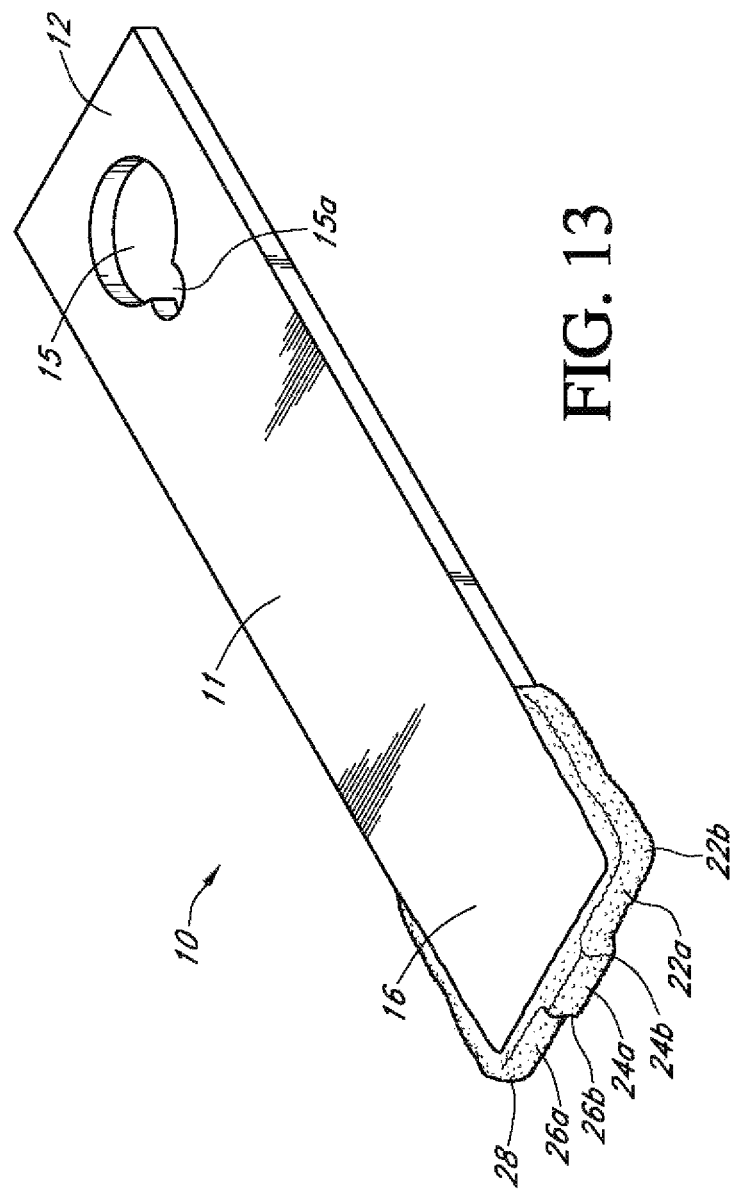
FIG. 13 provides a perspective view of a seventh embodiment of a notched hammer.

A seventh embodiment of the notched hammer is shown in FIG. 13. The notched hammer second end 16 of the seventh embodiment includes a plurality of contact surfaces 22a, 24a, and 26a, which increases the overall surface area available for contact with the material to be comminuted. The seventh embodiment includes a first, a second, and a third contact surface 22a, 24a, and 26a, respectively, which results in four distinct contact points—a first, second, third, and fourth contact points 22b, 24b, 26b, and 28.

During operation, two of the three contact surfaces 22a, 24a, 26a are working, depending on the direction of rotation of the notched hammer 10. The notched hammer 10 may be used bi-directionally by either changing the direction of rotation of the hammermill assembly 2 or by removing the notched hammer 10 and reinstalling it facing the opposite direction. For example, during normal operation in a first direction of rotation, primarily the first and second contact surfaces 22a, 24a will contact the material to be comminuted, and the first and second contact points 22b, 24b will likely comprise the primary working areas. Accordingly, the third contact surface 26a will be the trailing surface so that the third and fourth contact points 26b, 28 will exhibit very little wear.

If the direction of rotation of the notched hammer 10 is reversed either by reversing the direction of rotation of the hammermill assembly 10 or be reinstalling each notched hammer 10 in the opposite orientation, primarily the second and third contact surfaces 24a, 26a will contact the material to be communicated, and the third and fourth contact points 26b, 28 will likely comprise the primary working areas. Accordingly, the first contact surface 22a will be the trailing surface so that the first and second contact points 22b, 24b will likely exhibit very little wear.

The first, second, and third contact surfaces 22a, 24a, 26a are symmetrical with respect to the notched hammer 10 in the seventh embodiment. In the seventh embodiment, the linear distance from the center of the notched hammer rod hole 15 to the first, second, third, and fourth contact points 22b, 24b, 26b, 28, respectively, is equal. However, in other embodiments not pictured herein those distances may be different, or the contact surfaces 22a, 24a, 26a, and/or the contact points 22b, 24b, 26b, 28 may be different. In such embodiments the contact surfaces 22a, 24a, 26a are not symmetrical. In still other embodiments not pictured herein, the notched hammer 10 includes only two contact surfaces 22a, 24a, or more than three contact surfaces. Accordingly, the precise number of contact surfaces used in any embodiment of the notched hammer 10 in no way limits the scope of the notched hammer 10.

In the seventh embodiment, the thickness of the notched hammer first end 12, notched hammer neck 11, and notched hammer second end 16 is substantially equal. Furthermore, a hardened contact edge 20 has been welded to the notched hammer second end 16 to cover the first, second, and third contact surfaces 22a, 24a, 26a.

Figure 14:
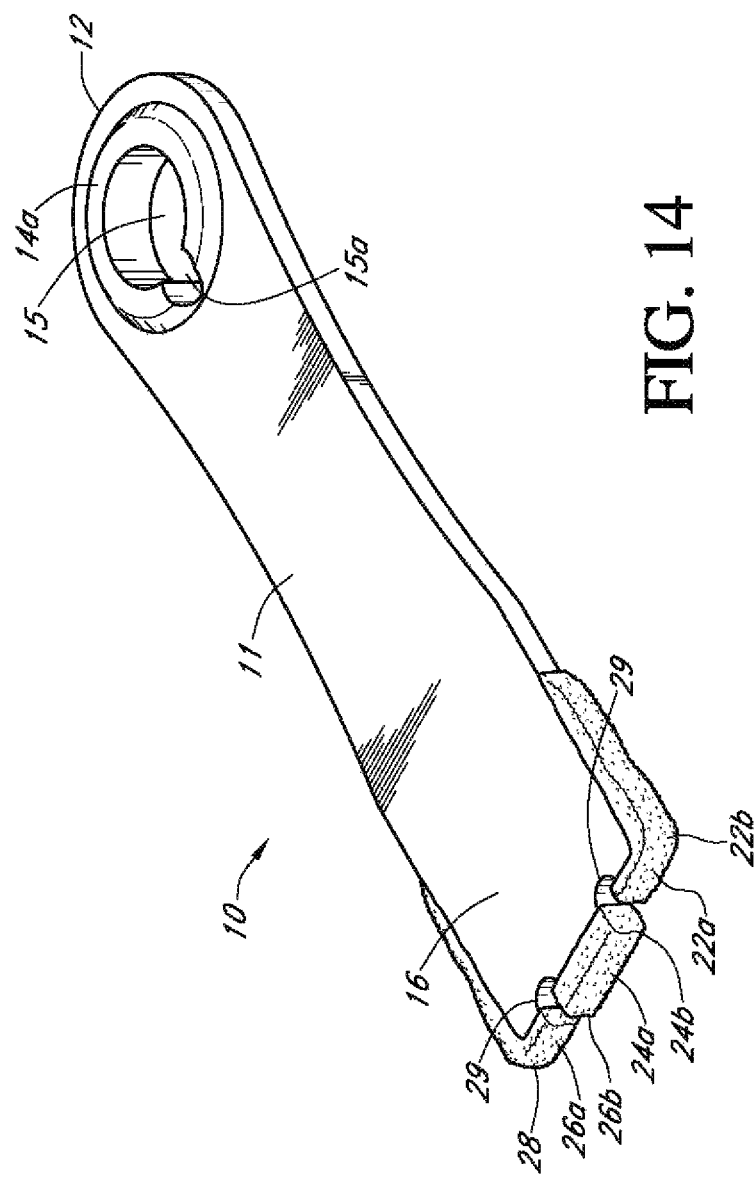
FIG. 14 provides a perspective view of an eighth embodiment of a notched hammer.

An eighth embodiment of the notched hammer 10 is shown in FIG. 14. This embodiment is similar to the seventh embodiment in that notched hammer second end 16 of the eighth embodiment includes three distinct contact surfaces 22a, 24a, 26a, and four distinct contact points 22b, 24b, 26b, 28. However, the notched hammer second end 16 in the eighth embodiment also includes a plurality of edge pockets 29. Each edge pocket 29 is a cutaway portion placed one of the contact surfaces 22a, 24a, 26a. In the eighth embodiment two edge pockets 29 are positioned on the notched hammer second end 16 symmetrically about either side of the second contact surface 24a. In other embodiments, the edge pockets 29 are not symmetrically positioned on the notched hammer second end 16, and the number of edge pockets 29 in no way limits the scope of the notched hammer 10. The edge pockets allow temporary insertion of "pocketing" of the material to be comminuted during rotation of the hammermill assembly 2 to increase loading upon the contact surfaces 22a, 24a, 26a, and thereby increase the contact efficiency between the notched hammer 10 and the material to be comminuted.

The depth of each edge pocket 29 may be proportional to the difference between the hammer swing length and the distance from the center of the notched hammer rod hole 15 to the first and third contact surfaces 22a, 26a. In many applications the depth of the edge pocket 29 is from 0.25 to twice the thickness of the notched hammer first end 12. The shape of the edge pocket 29 may be rounded, as shown in FIG. 14, or it may be angular in embodiments not pictured herein. Furthermore, the edge pockets 29 may be tapered so that the thickness thereof is not constant. The eight embodiment includes a hardened contact edge 20. It also includes notched hammer first and second shoulders 14a, 14b, and the edges of the notched hammer neck 11 are curved so that the notched hammer 10 is shaped similar to an hourglass.

A ninth embodiment of the notched hammer 10 is shown in FIG. 15. In this embodiment, the thickness of the notched hammer first end 12, notched hammer neck 11, and notched hammer second end 16 are substantially equal. The ninth embodiment includes notched hammer first and second shoulders 14a, 14b positioned around the periphery of the notched hammer rod hole 15.

However, unlike other embodiments previously described and disclosed herein, the notched hammer first and second shoulders 14a, 14b in the ninth embodiment are not symmetrical with respect to the notched hammer rod hole 15. This allows for overall weight and material reduction of the notched hammer 10 while still providing the benefits of reinforcement around the periphery of the notched hammer rod hole 15 provided by notched hammer shoulders 14a, 14b as previously described in detail. The ninth embodiment also includes a hardened contact edge 20, and the edges of the notched hammer neck 11 are curved.

The various features and or elements that differentiate one embodiment of the notched hammer 10 from another embodiment may be added or removed from various other embodiments to result in a nearly infinite number of embodiments. Whether shown in the various figures herein, all embodiments may include a notched hammer first shoulder 14a alone or in combination with a notched hammer second shoulder 14a having an infinite number of configurations, which may or may not be symmetrical with one another and/or the notched hammer rod hole 15. Furthermore, any embodiment may have notched hammer first and/or second shoulders 14a, 14b on both sides of the notched hammer 10.

Other features/configurations that may be included on any embodiments alone or in combination include: (1) curved or straight edges on the notched hammer neck 11; (2) reduced thickness of the notched hammer neck 11 with respect to the notched hammer first end 12 and/or notched hammer second end 16; (3) curved or angular notched hammer first ends 12; (4) hardened contact edges 20; (5) neck voids 11a; (6) multiple contact points; (7) multiple contact surfaces; (8) edge pockets 29; and, (9) multiple blades, which is described in detail below, or any combinations thereof. Furthermore, any embodiment may be bidirectional. Any embodiment of the notched hammer 10 may be heat treated if such heat treatment will impart desirable characteristics to the notched hammer 10 for the particular application.

In embodiments of the notched hammer 10 having a notched hammer neck 11 that is reduced in width (i.e., wherein the edges are curved) or thickness, it is contemplated that the notched hammer 10 will be manufactured by forging the steel used to produce the notched hammer 10. This is because forging typically in a finer grain structure that is much stronger than casting the notched hammer 10 from steel or rolling it from bar stock as found in the prior art. However, the notched hammer 10 is not so limited by the method of construction, and any method of construction known to those of ordinary skill in the art may be used including casting, rolling, stamping, machining, and welding.

Another benefit of some of the embodiments of the notched hammer 10 is that the amount of surface area supporting attachment of the notched hammer 10 to the hammer rod 8 is dramatically increased. This eliminates or reduces the wear or grooving of the hammer rod 8 caused by rotation of the notched hammer 10 during use. The ratio of surface area available to support the notched hammer 10 to the weight and/or overall thickness of the notched hammer 10 may be optimized with less material using various embodiments disclosed herein. Increasing the surface area available to support the notched hammer 10 on the hammer rod 8 while improving securement of the notched hammer 10 to the hammer rod 8 also increases the amount of material in the notched hammer 10 available to absorb or distribute operational stresses while still providing the benefits of the free-swinging hammer design (i.e., recoil to non-destructible foreign objects).

Embodiments of the notched hammer 10 having only a notched hammer first shoulder 14a or notched hammer first and second shoulders 14a, 14b (oriented either non-symmetrical with respect to the notched hammer rod hole 15, such as the ninth embodiment shown in FIG. 15 or symmetrical, such as the third, sixth, or eighth embodiments, shown in FIGS. 9, 12, and 14, respectively) may be especially useful with the rod hole notch 15a. In such embodiments it is contemplated that the thickness of the notched hammer first and second shoulders 14a, 14b will be 0.5 inches or greater, but may be less for other embodiments.

It should be noted that the present invention is not limited to the specific embodiments pictured and described herein, but is intended to apply to all similar apparatuses for improving hammermill hammer structure and operation. Modifications and alterations from the described embodiments will occur to those skilled in the art without departure from the spirit and scope of the notched hammer 10.

3. Illustrative Embodiments of Multiple Blade Hammer

Several exemplary embodiments of a multiple blade hammer 30 will now be described. The preferred embodiment will vary depending on the particular application for the multiple blade hammer 30, and the exemplary embodiments described and disclosed herein represent just some of an infinite number of variations to the multiple blade hammer 30 that will naturally occur to those skilled in the art.

Figure 16:
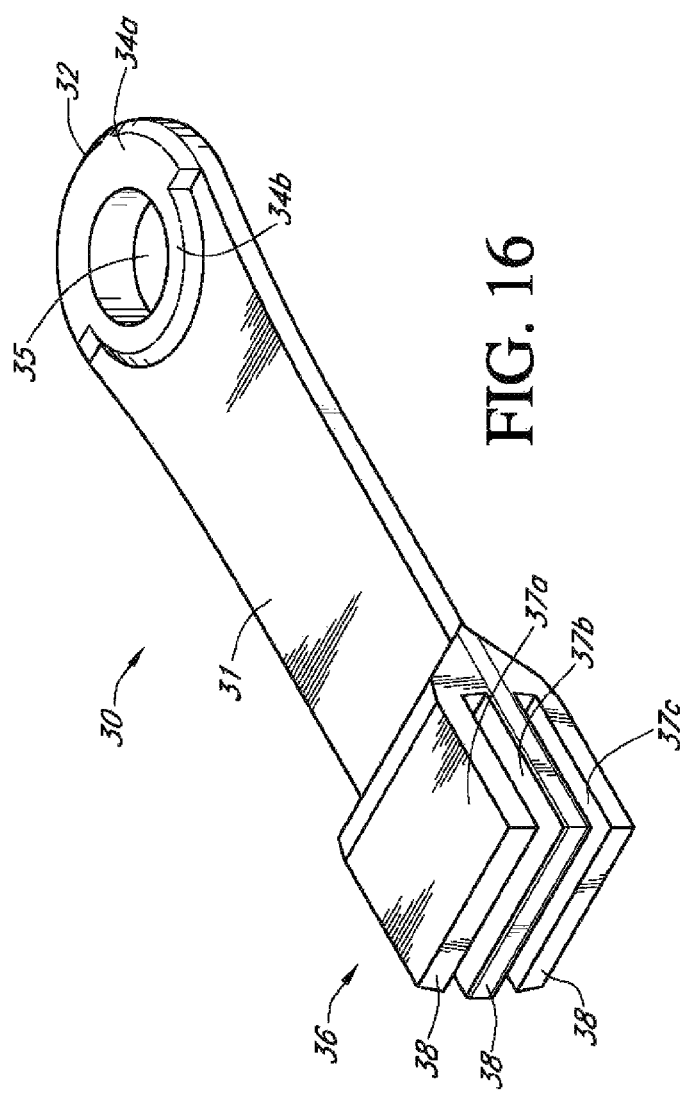
FIG. 16 provides a perspective view of a first embodiment of a multiple blade hammer.

A perspective view of a first embodiment of a multiple blade hammer 30 is shown in FIG. 16. The first embodiment is a metallic-based multiple blade hammer 30 for use in a rotatable hammermill assembly 2 as shown in FIGS. 1-3. Other embodiments of the multiple blade hammer 30 for use with types of hammermill assemblies other than that shown and described herein are included within the scope of the multiple blade hammer 30.

Figure 17:
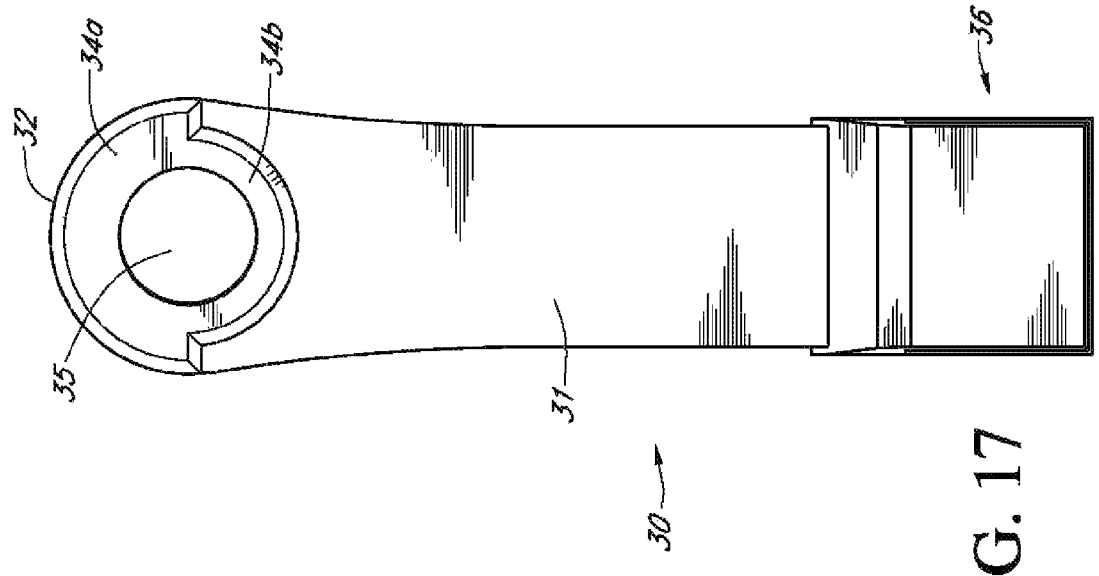
FIG. 17 provides a top view of the first embodiment of a multiple blade hammer.

The multiple blade hammer 30 includes a multiple blade hammer first end 32 and a multiple blade hammer second end 36, which are connected to one another via a multiple blade hammer neck 11. The multiple blade hammer 30 in the first embodiment includes a multiple blade hammer rod hole 35 formed in the multiple blade hammer first end 32. Multiple blade hammer first and second shoulders 34a, 34b both surround the multiple blade hammer rod hold 35, which is shown most clearly in FIGS. 16 and 17. In this respect, the multiple blade hammer first end 32 is configured in a very similar manner to the notched hammer first end 12 in the ninth embodiment thereof, which is shown in FIG. 15. Accordingly, the multiple blade hammer first and second shoulders 34a, 34b in the first embodiment of the multiple blade hammer 30 are not symmetrical with respect to the multiple blade hammer rod hole 35.

In other embodiments of the multiple blade hammer 30 not pictured herein, the multiple blade hammer first and second shoulders 34a, 34b may be symmetrical with respect to the multiple blade hammer rod hole 35. In such embodiments of the multiple blade hammer 30, the multiple blade hammer first end 32 would be configured in a manner similar to the notched hammer first end 12 in the third embodiment thereof, which is shown in FIG. 9. In other embodiment of the multiple blade hammer 30 not pictured herein, only a first multiple blade hammer shoulder 34a may surround the multiple blade hammer rod hole 35. In such embodiments of the multiple blade hammer 30, the multiple blade hammer first end 32 would be configured in a manner similar to the notched hammer first end 12 in the first embodiment thereof, which is shown in FIG. 5. In still other embodiments of the multiple blade hammer 30 not pictured herein, the multiple blade hammer neck 31 is reduced in thickness compared to the thickness of the multiple blade hammer first end 32. In such embodiments of the multiple blade hammer 30, the multiple blade hammer first end 32 would be configured in a manner similar to the notched hammer first end 12 in the second embodiment thereof, which is shown in FIG. 8. Accordingly, it will become apparent to those skilled in the art in light of the present disclosure that the multiple blade hammer first end 32 may include a multiple blade hammer first shoulder 34a and/or a multiple blade hammer second shoulder 34b, both of which may be in any configuration/orientation disclosed for the notched hammer 10.

The multiple blade hammer second end 36, which is the contact end, in the first embodiment includes a first, second, and third blade 37a, 37b, 37c. These three blades 37a, 37b, 37c provide for three distinct contact surfaces in the axial direction, which is best seen in FIG. 16. The multiple blade hammer second end 36 provides for contact and delivery of momentum to material to be comminuted. The multiple blade hammer second end 36 includes at least two blades 37a, 37b, and in the first embodiment pictured herein includes three blades 37a, 37b, 37c. Accordingly, the multiple blade hammer 30 may be configured with two or more blades 37a, 37b, 37c depending on the particular application, and the scope of the multiple blade hammer 30 extends to any hammer having two or more blades 37a, 37b, 37c. The at least two blades 4 have combined width greater than the width of the multiple blade hammer first end 32. The distance between the blades 37a, 37b, 37c will vary depending on the specific application of the multiple blade hammer 30, and in the first embodiment the distance between the blades 37a, 37b, 37c is approximately equal to the thickness of the blades 37a, 37b, 37c, which is approximately one-fourth of an inch. However, the particular dimensions and/or orientation of the blades 37a, 37b, 37c is in no way limiting.

In other embodiments not pictured herein, the multiple blade hammer 30 structure may undergo further manufacturing work and have tungsten carbide welded to the periphery of each of the hammer blades 37a, 37b, 37c for increased hardness and abrasion resistance. Furthermore, the multiple blade hammer first end 32, second end 36, and neck 31 may be heat-treated for hardness. It is contemplated that in many embodiments of the multiple blade hammer 30 it will be beneficial to construct the multiple blade hammer 30 using forging techniques. However, the scope of the multiple blade hammer 30 is not so limited, and other methods of construction known to those of ordinary skill in the art may be used including casting, machining and welding.

In other embodiments of the multiple blade hammer 30 not pictured herein, the multiple blade hammer 30 may have neck voids 11a placed in the multiple blade hammer neck 31. In still other embodiments of the multiple blade hammer 30 not pictured herein, the thickness of the multiple blade hammer neck 31 may be less than the thickness of either the multiple blade hammer first end 32 or second end 36. In such embodiments of the multiple blade hammer 30, the multiple blade hammer first end 32 and neck 31 would be configured substantially similar to the notched hammer first end 12 and 11 in the fourth embodiment thereof, which is shown in FIG. 10.

In still other embodiments of the multiple blade hammer 30 not pictured herein, each blade 37a, 37b, 37c may be configured to have more than one distinct contact point. In such embodiments of the multiple blade hammer 30, each blade 37a, 37b, 37c would be configured substantially similar to the notched hammer second end 16 in the seventh embodiment thereof, which is shown in FIG. 13. Edge pockets 29 may be positioned in any of the blades 37a, 37b, 37c in variations of such embodiments, the configuration of which is not limiting to the scope of the multiple blade hammer 30 in any way, and may vary in a manner previously explained for the eighth embodiment of the notched hammer 10.

Figure 18:
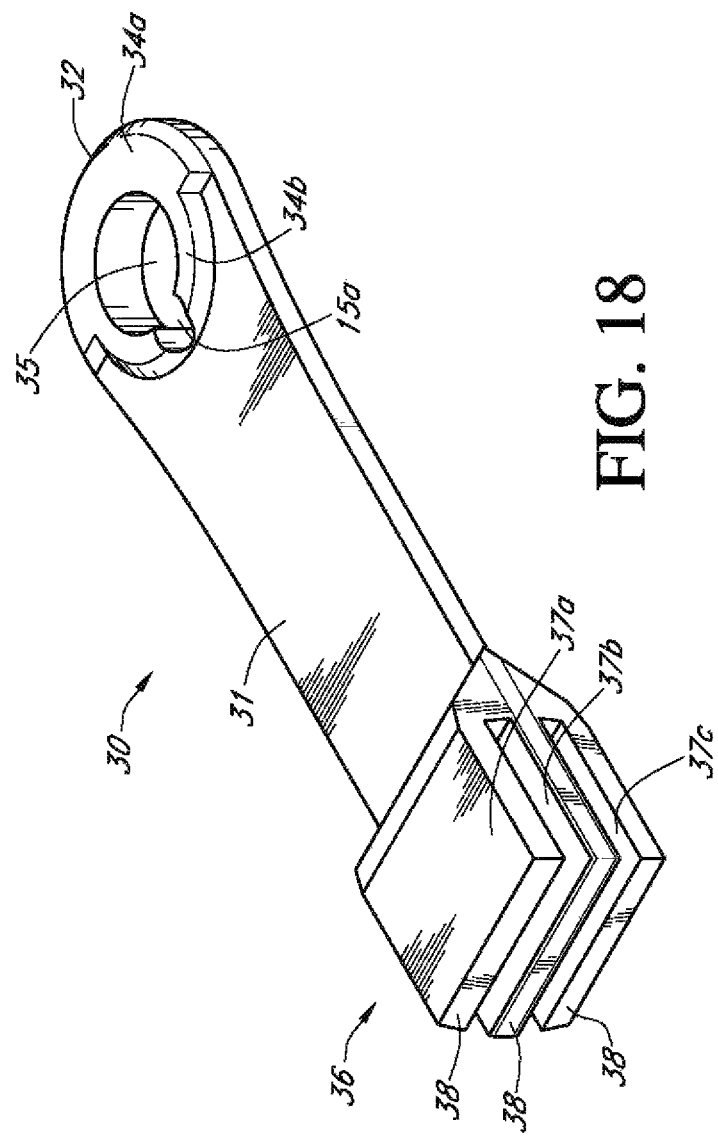
FIG. 18 provides a perspective view of a second embodiment of a multiple blade hammer.

A second embodiment of the multiple blade hammer 30 is shown in FIG. 18. In the second embodiment the multiple blade hammer rod hole 35 is formed with at least one rod hole notch 15 The at least one rod hole notch 15a transverses the length of the multiple blade hammer rod hole 35 and is aligned with the multiple blade hammer neck 31. As shown in FIG. 18, the longitudinal axis of the rod hole notch 15a is parallel with the longitudinal axis of the multiple blade hammer rod hole 35, but may have different orientations in embodiments not pictured or described herein, such as an embodiment wherein the rod hole notch 15a is not parallel to the longitudinal axis of the multiple blade hammer rod hole 15. Furthermore, the cross-sectional shape of the rod hold notch 15a may be any shape, such as circular, oblong, angular, or any other shape known to those skilled in the art. Additionally, the cross-sectional shape of the rod hole notch 15a may vary along its length.

The various features and or elements that differentiate one embodiment of the multiple blade hammer 30 from another embodiment may be added or removed from various other embodiments to result in a nearly infinite number of embodiments. Whether shown in the various figures herein, all embodiments may include a multiple blade hammer first shoulder 34a alone or in combination with a multiple blade hammer second shoulder 34a having an infinite number of configurations, which may or may not be symmetrical with one another and/or the multiple blade hammer rod hole 35. Furthermore, any embodiment may have multiple blade hammer first and/or second shoulders 34a, 34b on both sides of the multiple blade hammer 30.

Other features/configurations that may be included on any embodiments alone or in combination include: (1) curved or straight edges on the multiple blade hammer neck 31; (2) reduced thickness of the multiple blade hammer neck 31 with respect to the multiple blade hammer first end 32 and/or any blades 37a, 37b, 37c; (3) curved or angular multiple blade hammer first ends 32; (4) hardened contact edges 20 positioned on and/or adjacent to the blade edges 38; (5) neck voids 11a; (6) multiple contact points on any blade 37a, 37b, 37c; (7) multiple contact surfaces; (8) edge pockets 29; and, (9) multiple blades 37a, 37b, 37c, which is described in detail below, or any combinations thereof. Furthermore, any embodiment may be bidirectional. Any embodiment of the multiple blade hammer 30 may be heat treated if such heat treatment will impart desirable characteristics to the multiple blade hammer 30 for the particular application.

In embodiments of the multiple blade hammer 30 having a multiple blade hammer neck 31 that is reduced in width (i.e., wherein the edges are curved) or thickness, it is contemplated that the multiple blade hammer 30 will be manufactured by forging the steel used to produce the multiple blade hammer 30. This is because forging typically in a finer grain structure that is much stronger than casting the multiple blade hammer 30 from steel or rolling it from bar stock as found in the prior art. However, the multiple blade hammer 30 is not so limited by the method of construction, and any method of construction known to those of ordinary skill in the art may be used including casting, rolling, stamping, machining, and welding.

Another benefit of some of the embodiments of the multiple blade hammer 30 is that the amount of surface area supporting attachment of the multiple blade hammer 30 to the hammer rod 8 is dramatically increased. This eliminates or reduces the wear or grooving of the hammer rod 8 caused by rotation of the multiple blade hammer 30 during use. The ratio of surface area available to support the multiple blade hammer 30 to the weight and/or overall thickness of the multiple blade hammer 30 may be optimized with less material using various embodiments disclosed herein. Increasing the surface area available to support the multiple blade hammer 30 on the hammer rod 8 while improving securement of the multiple blade hammer 30 to the hammer rod 8 also increases the amount of material in the multiple blade hammer 30 available to absorb or distribute operational stresses while still providing the benefits of the free-swinging hammer design (i.e., recoil to non-destructible foreign objects).

Embodiments of the multiple blade hammer 30 having only a multiple blade hammer first shoulder 34a or multiple blade hammer first and second shoulders 34a, 34b (oriented either non-symmetrical with respect to the multiple blade hammer rod hole 35 or symmetrical) may be especially useful with the rod hole notch 15a. In such embodiments it is contemplated that the thickness of the multiple blade hammer first and second shoulders 34a, 34b will be 0.5 inches or greater, but may be less for other embodiments.

It should be noted that the present invention is not limited to the specific embodiments pictured and described herein, but is intended to apply to all similar apparatuses for improving hammermill hammer structure and operation. Modifications and alterations from the described embodiments will occur to those skilled in the art without departure from the spirit and scope of the multiple blade hammer 30.

4. Illustrative Embodiments of Dual-Blade Hammer

Figure 19:
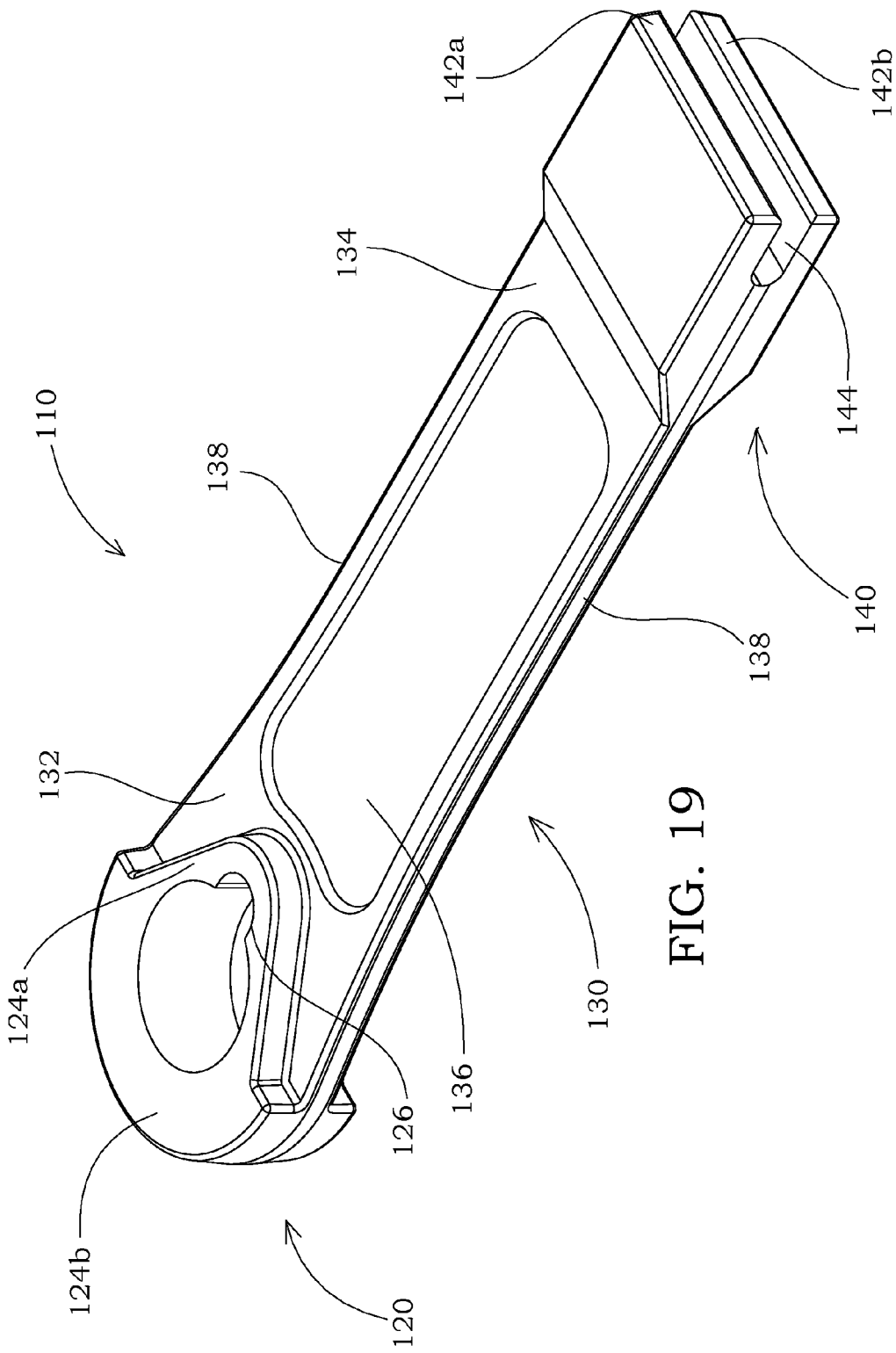
FIG. 19 provides a perspective view of one embodiment of a dual-blade hammer.

Referring now to the drawings, wherein like reference numerals designate identical or corresponding parts throughout the several views, FIG. 19 provides a perspective view of one embodiment the dual-blade hammer 110. The embodiment of the dual-blade hammer 110 pictured herein includes a connector end 120, a contact end 140, and a neck 130 positioned between the connector end 120 and contact end 140. In the embodiment pictured herein, the neck first end 132 is affixed to the connector end 120 and the neck second end 134 is affixed to the contact end 140.

Figure 20:
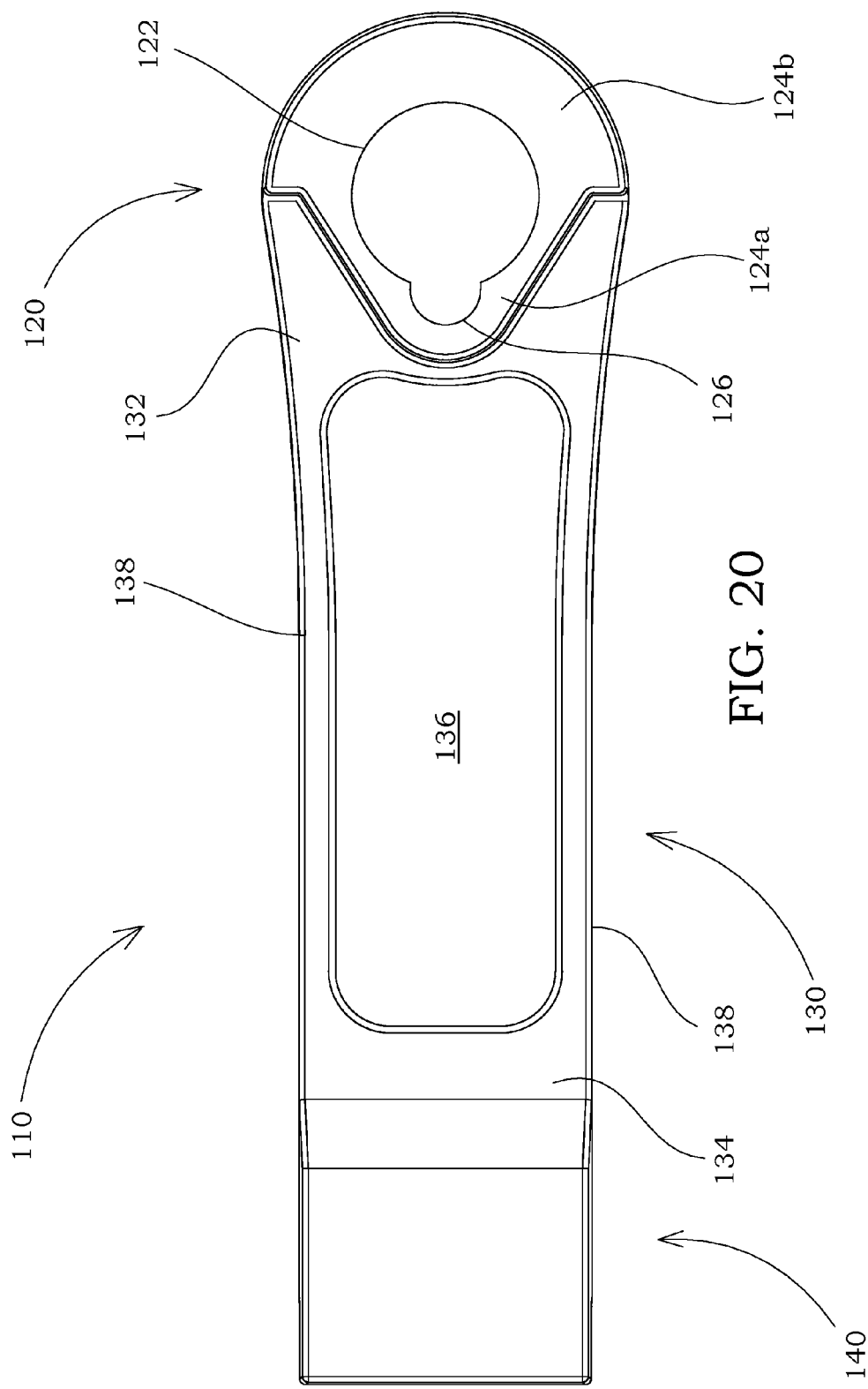
FIG. 20 provides a front view of one embodiment of the dual-blade hammer.

The connector end 120 in the embodiment pictured herein is formed with a rod hole 122 therethrough. The rod hole 122 may be formed with a notch 126 therein as well, as best shown in FIG. 20. The rod hole 122 serves to pivotally attach the dual-blade hammer 110 to a hammer pin or rod (neither shown) of a hammermill assembly. Hammer pins and rods used in hammermill assemblies and their operation are not further described herein for purposes of clarity, but are well known to those skilled in the art.

The connector end 120 may also include a first shoulder 124a positioned around the periphery of the rod hole 122. The notch 126 may protrude into the first shoulder 124a, as shown in the embodiment of the dual-blade hammer 110 pictured in FIGS. 19 and 20. A second shoulder 124b may also be positioned around a portion of the periphery of the first shoulder 124a. In the embodiment pictured herein, the second shoulder 124b encompasses approximately one-half of the periphery of the first shoulder and is positioned opposite the area of the first shoulder 124a in which the notch 126 is formed.

As shown herein, the first shoulder 124a is not generally circular in shape, but rather it is generally triangular in shape with a rounded vertex adjacent the notch 126, and the thicknesses of the first and second shoulders 124a, 124b are approximately equal. This configuration allows for discrepancies in the location of the rod hole 122 to account for machining differences within the hammermill. That is, the precise location of the rod hole 122 and notch 126 may be adjusted by a predetermined amount along the length of the connector end 120 to adjust the swing length of the dual-blade hammer 110. That is, an area exists in the connector end 120 in which the rod hole 122 may be positioned such that the rod hole 122 is within the periphery of the first and second shoulders 124a, 124b. In such a case, the dual blade hammer 110 would be formed without a rod hole 122, and the rod hole 122 would be added just prior to installation in a hammermill so that the swing length of the dual-blade hammer 110 could be precisely set. The area in which the rod hole 122 could be formed may have a different size in one embodiment of the dual-blade hammer 110 to the next, and the amount of swing-length adjustment will also depend on the size of the rod hole 122. However, it is contemplated that the most critical dimension of this area will be along the length of the dual-blade hammer 110, and the amount of adjustment in that dimension may be as small or as large as required by the tolerances of the hammermill, and is therefore in no way limiting to the scope of the dual-blade hammer 110.

In the pictured embodiment of the dual-blade hammer 110, a line of symmetry exists along the length of the dual-blade hammer from the view shown in FIG. 20. This line of symmetry bisects the rod hole 122 and notch 126, and passes through the vertex of the first shoulder 124a. In other embodiments not pictured herein, the first shoulder 124a may extend further down the neck 130 than it does in the illustrative embodiment, allowing even more adjustment in the swing length of the dual-blade hammer 110. Alternatively, the first shoulder 124a may be generally semi-circular in shape, such as in the notched hammer first shoulder 14a shown in FIG. 15. Accordingly, the specific shape and/or configuration of the first shoulder 124a and/or second shoulder 124b in no way limit the scope of the dual-blade hammer 110 as disclosed and claimed herein.

Figure 21:
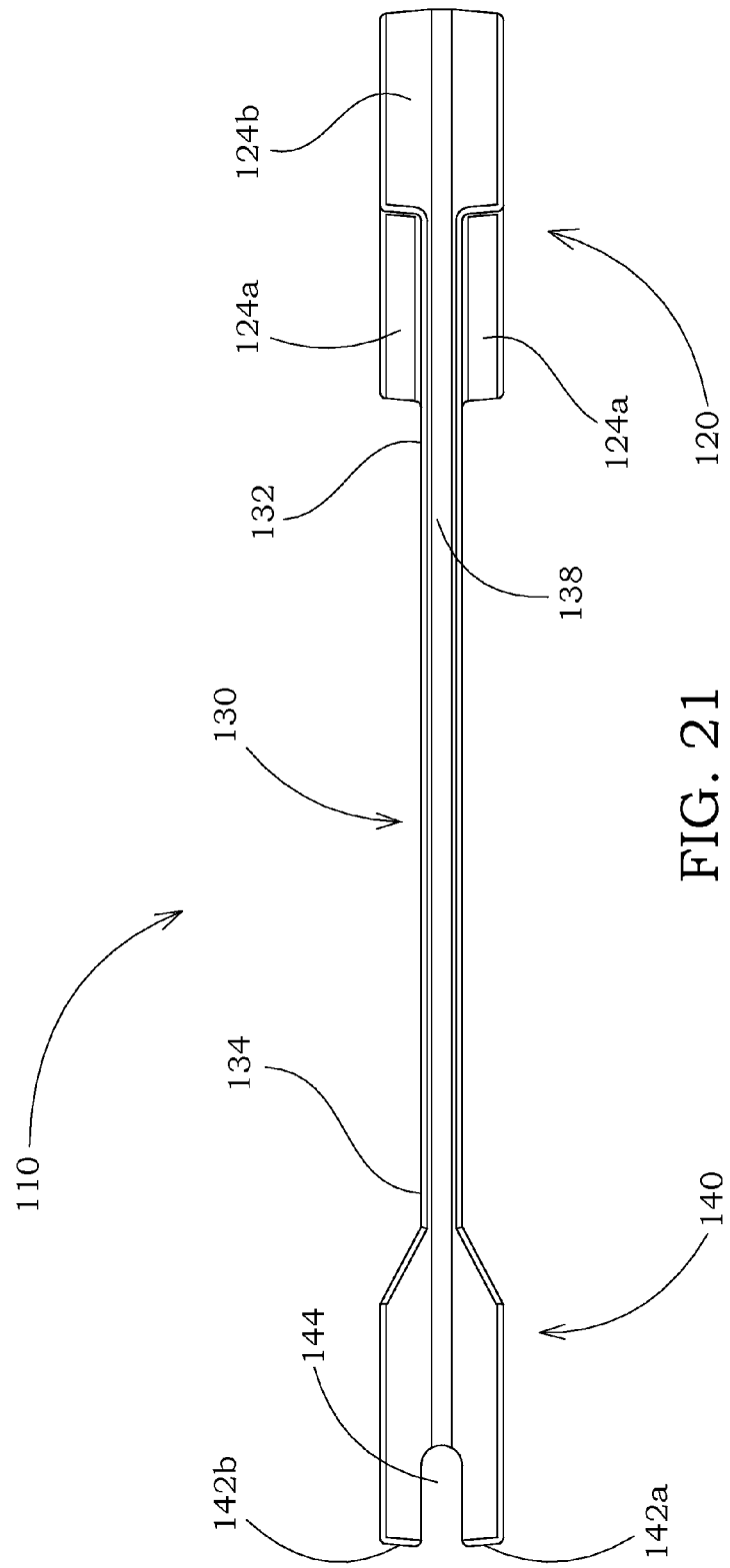
FIG. 21 provides a side view of one embodiment of the dual-blade hammer.

The first and/or second shoulders 124a, 124b provide increased strength and longevity to the dual-blade hammer 110 in many applications, as is well known to those skilled in the art. In the embodiment pictured herein, both the first and second shoulders 124a, 124b are positioned on both sides of the rod hole 122, which is best shown in FIG. 21. However, in other embodiments not pictured herein, either the first or second shoulder 124a, 124b may be positioned on only one side of the rod hole 122. The optimal dimensions of both the first and second shoulders 124a, 124b will vary depending on the specific application of the dual-blade hammer 110, and are therefore in no way limiting to the scope of the dual-blade hammer 110. In the embodiment pictured herein, the thickness of both the first and second shoulders 124a, 124b is 0.75 inches.

Figure 22:
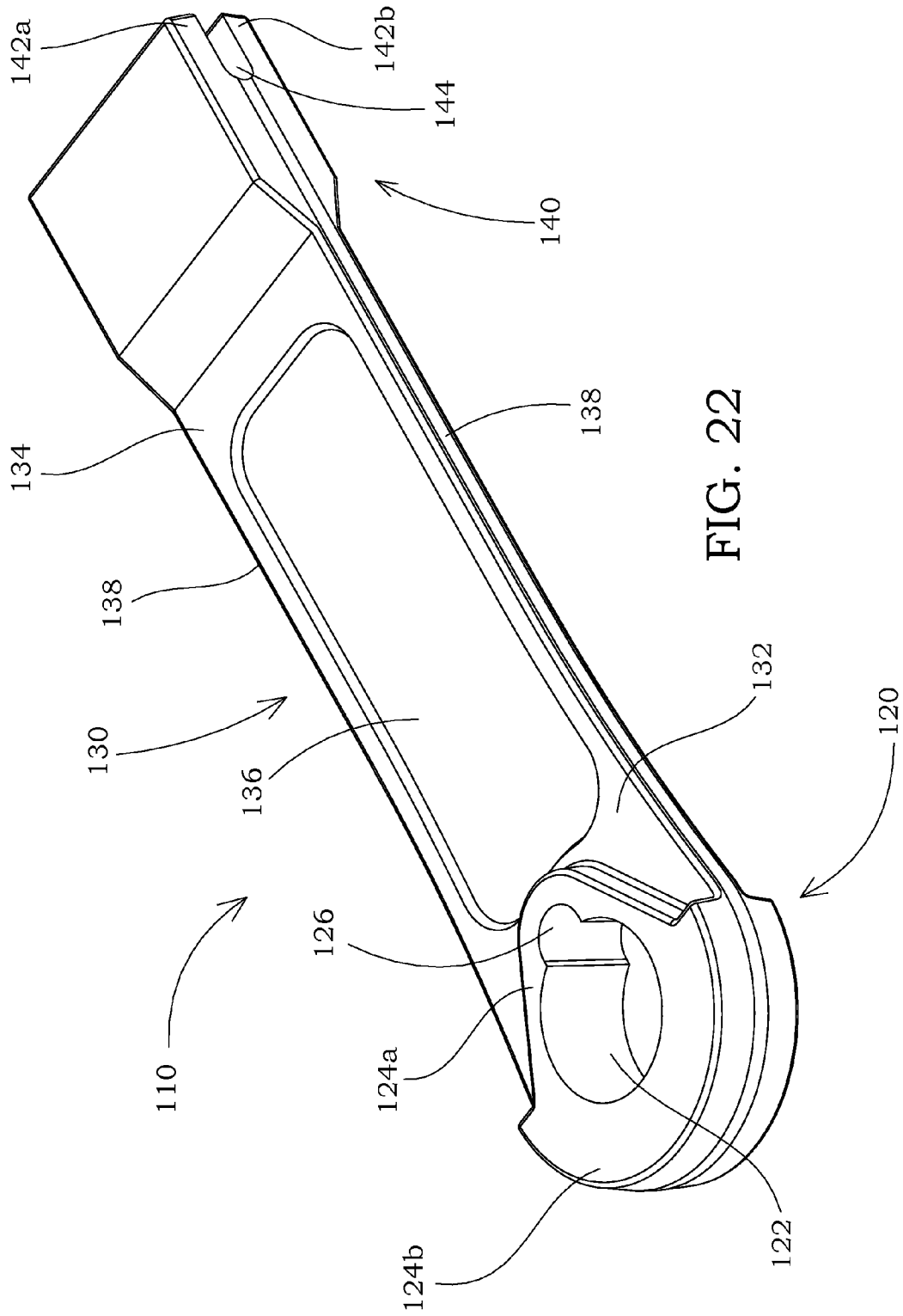
FIG. 22 provides a second perspective view of one embodiment of the dual-blade hammer.

In the embodiments pictured herein, the connector end 120 is rounded, as best shown in FIGS. 19, 20, and 22. In the embodiment of the dual-blade hammer 110 pictured herein, the outer diameter of the connector end is 2.5 inches. However, in other embodiments not pictured herein, the connector end 120 may have other shapes, such as rectangular, triangular, elliptical, or otherwise without departing from the spirit and scope of the dual-blade hammer 110 as disclosed herein. Furthermore, the relative dimensions and angles of the various elements of the dual-blade hammer 110 may be adjusted for the specific application of the dual-blade hammer 110, and therefore an infinite number of variations of the dual-blade hammer 110 exist, and such variations will naturally occur to those skilled in the art without departing from the spirit and scope of the dual-blade hammer 110.

As best shown in FIG. 20, the neck edges 138 of the embodiment of the dual-blade hammer 110 pictured herein are non-linear. In the embodiment pictured herein, curvature of both neck edges 138 is derived from a circle having a radius of eighteen inches. However, the precise orientation and/or configuration of the neck edges 138 are in no way limiting in scope. Accordingly, in other embodiments of the dual-blade hammer 110 not pictured herein the neck edges 138 may be linear. The optimal width, curvature, and configuration of the neck 30 will vary depending on the specific application of the dual-blade hammer 110, which may depend on the type of material to be comminuted.

The neck 130 of the dual-blade hammer 110 includes at least one neck recess 136, which is best shown in FIGS. 19, 20, and 22. The neck recess 136 in the embodiment pictured herein is generally rectangular in shape with rounded corners, but may have other shapes in other embodiments not shown herein. The curved portions of the neck recess 136 pictured herein are derived from circles having radii of three and one-half inches, which may be more or less in other embodiments not pictured herein. One or more neck recesses 136 may be formed in each side of the neck 130, and the optimal number, orientation, and configuration of neck recesses 136 will depend on the specific application of the dual-blade hammer 110. In the embodiment pictured herein, the dual-blade hammer 110 includes two identical neck recesses 136 symmetrically (with respect to the orientation shown in FIG. 21) positioned on each side of the neck 130.

In the embodiment pictured herein, each neck recess 136 protrudes into the neck 130 by 0.075 inches, such that the width of the neck 130 between the two neck recesses 136 is 0.1 inch.

Accordingly, the thickness of the neck 130 at a position thereof in which no neck recesses 136 protrude is 0.25 inches. However, the dimensions of the neck 130, including the thickness thereof adjacent to neck recesses 136, and the dimensions, configuration, and/or placement of neck recesses 136 is in no way limiting to the scope of the dual-blade hammer 110. The dual-blade hammer 110 may have any number of neck recesses 136 (e.g., a single neck recess 136 on one side of the neck 130, multiple neck recesses 136 on one side of the neck 130, multiple recesses 136 on both sides of the neck 130, etc.). Furthermore, the neck recesses 136 may have any shape without departing from the spirit and scope of the dual-blade hammer 110 as disclosed and claimed herein. In other embodiments of the dual-blade hammer 110 not pictured herein the neck recess(s) 136 may extend through the neck 130. In such embodiments, the neck recess(s) 136 would appear as voids positioned in the neck 130. Several such embodiments of such voids are disclosed in U.S. Pat. No. 7,559,497, which is incorporated by reference herein in its entirety.

The neck second end 134 is affixed to the contact end 140. The contact end 140, which delivers energy to the material to be comminuted, may have an infinite number of configurations, the optimal of which will depend on the particular application of the dual-blade hammer 110. For example in embodiments not pictured herein, the contact end 140 may be comprised of a single contact surface with multiple contact points, or it may be configured with multiple contact surfaces having multiple contact points. Certain embodiments of the contact end 140 that may be included with the dual-blade hammer 10 are disclosed in U.S. patent application Ser. No. 12/398,007, which is incorporated by reference herein in its entirety.

In the embodiment pictured herein, the contact end 140 is formed with a first contact surface 142a and a second contact surface 142b, wherein the two contact surfaces 142a, 142b are separated from one another by an interstitial area 144. Other embodiments of the dual-blade hammer 110 may include a weld-hardened edge on one or more of the contact surfaces 142a, 142b. In the embodiment of the dual-blade hammer 110 pictured herein, the width of the contact end 140 is two inches, and the overall thickness of the contact end is 0.75 inches. The thickness of the interstitial area 144 is 0.1 inches. However, as stated above, the contact end 140 may take on any orientation and/or configuration without departing from the spirit and scope of the dual-blade hammer 110 as disclosed and claimed herein.

The materials used to construct the connector end 120, first or second shoulder 124a, 124b, neck 130, and contact end 140 will vary depending on the specific application for the dual-blade hammer 110. Certain applications will require a high tensile strength material, such as steel, while others may require different materials, such as carbide-containing alloys. Accordingly, the above-referenced elements may be constructed of any material known to those skilled in the art, which material is appropriate for the specific application of the dual-blade hammer 110, without departing from the spirit and scope thereof.

Other methods of using the dual-blade hammer 110 and embodiments thereof will become apparent to those skilled in the art in light of the present disclosure. Accordingly, the methods and embodiments pictured and described herein are for illustrative purposes only. The dual-blade hammer 110 also may be used in other manners, and therefore the specific hammermill in which the dual-blade hammer 110 is used in no way limits the scope of the dual-blade hammer 110.

It should be noted that the dual-blade hammer 110 is not limited to the specific embodiments pictured and described herein, but is intended to apply to all similar apparatuses for reducing the weight of a communiting instrument while retaining the strength thereof. Modifications and alterations from the described embodiments will occur to those skilled in the art without departure from the spirit and scope of the dual-blade hammer 110.

The invention claimed is:

1. A hammer for use in a rotatable hammermill assembly, said hammer comprising:
   a. a connector end;
   b. a rod hole positioned in said connector end;
   c. a neck having a first and second end, said neck first end connected to said connector end;
   d. a contact end connected to said neck second end;
   e. a neck recess formed in said neck between said neck first and second ends;
   f. a first shoulder adjacent top and surrounding a first portion of said rod hole; and,
   g. a second shoulder adjacent to and surrounding a second portion of said rod hole, wherein said first shoulder and said second shoulder are non-symmetrical about the longitudinal axis of said rod hole.

2. The hammer according to claim 1 wherein said hammer further comprises a plurality of welds affixed to said contact end.

3. The hammer according to claim 1 wherein said contact end is further defined as comprising:
   a. a first contact surface;
   b. an interstitial area adjacent said first contact surface; and
   c. a second contact surface adjacent said interstitial area.

4. The hammer according to claim 1 wherein said neck is further defined as having neck edges that are not linear.

5. The hammer according to claim 1 wherein said hammer is further defined as being forged.

6. The hammer according to claim 1 wherein each side of said hammer comprises a neck recess.

7. A hammer for use in a rotatable hammermill assembly, said hammer comprising:
   a. a connector end;
   b. a rod hole positioned in said connector end;
   c. a first shoulder surrounding a first portion of said rod hole;
   d. a second shoulder surrounding a second portion of said rod hole wherein said first shoulder and said second shoulder are non-symmetrical about the longitudinal axis of said rod hole;
   e. a neck having a first and second end, said neck first end connected to said connector end;
   f. a contact end connected to said neck second end; and
   g. a neck recess formed in said neck between said neck first and second ends.

8. The hammer according to claim 7 wherein said first shoulder is further defined as being generally triangular in shape, wherein the vertex is pointed toward said contact end.

9. The hammer according to claim 8 wherein said hammer further comprises a notch, and wherein said notch is positioned in said first shoulder.

10. The hammer according to claim 9 wherein said contact end is further defined as comprising:
    a. a first contact surface;
    b. an interstitial area adjacent said first contact surface; and
    c. a second contact surface adjacent said interstitial area.

11. The hammer according to claim 10 wherein each side of said hammer comprises a neck recess.

* * * * *